(12) United States Patent
Matsuoka et al.

(10) Patent No.: US 8,586,273 B2
(45) Date of Patent: Nov. 19, 2013

(54) BINDER RESIN FOR TONER, TONER AND METHOD FOR PRODUCING SAME

(75) Inventors: Hiroshi Matsuoka, Ichihara (JP); Hiroyuki Takei, Kamagaya (JP); Linwood Blanton Muire, III, Chiba (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 0 days.

(21) Appl. No.: 13/510,802

(22) PCT Filed: Nov. 15, 2010

(86) PCT No.: PCT/JP2010/006696
§ 371 (c)(1),
(2), (4) Date: May 18, 2012

(87) PCT Pub. No.: WO2011/061917
PCT Pub. Date: May 26, 2011

(65) Prior Publication Data
US 2012/0231389 A1    Sep. 13, 2012

(30) Foreign Application Priority Data
Nov. 20, 2009  (JP) ................. 2009-265071

(51) Int. Cl.
*G03G 9/087*        (2006.01)

(52) U.S. Cl.
USPC ............. 430/109.1; 430/109.2; 430/109.3; 430/109.4

(58) Field of Classification Search
USPC ............. 430/109.1, 109.2, 109.3, 109.4
See application file for complete search history.

(56) References Cited

U.S. PATENT DOCUMENTS

| 5,989,770 | A | 11/1999 | Ugai et al. |
| 8,445,170 | B2 * | 5/2013 | Sakata et al. ............ 430/109.2 |
| 2004/0161688 | A1 | 8/2004 | Itakura et al. |
| 2004/0234878 | A1 | 11/2004 | Miyazaki et al. |
| 2006/0063087 | A1 | 3/2006 | Ninomiya et al. |
| 2007/0269733 | A1 | 11/2007 | Ohta et al. |
| 2009/0311619 | A1 | 12/2009 | Matsuoka et al. |
| 2010/0248121 | A1 * | 9/2010 | Sakata et al. ............ 430/109.2 |

FOREIGN PATENT DOCUMENTS

| CN | 1752854 A | 3/2006 |
| CN | 101091139 A | 12/2007 |
| CN | 101563655 A | 10/2009 |
| JP | 3-231757 A | 10/1991 |
| JP | 2872347 B2 | 3/1999 |
| JP | 2931899 B1 | 8/1999 |
| JP | 2000-010343 A | 1/2000 |
| JP | 3532033 B2 | 5/2004 |
| JP | 2004-233983 A | 8/2004 |
| JP | 2006-171364 A | 6/2006 |
| JP | 3794762 B2 | 7/2006 |
| JP | 2007-071993 A | 3/2007 |
| JP | 2007-127828 A | 5/2007 |
| JP | 3971228 B2 | 9/2007 |
| JP | 2008-015232 A | 1/2008 |
| JP | 2008-102390 A | 5/2008 |
| WO | 2009/028176 * | 3/2009 |
| WO | WO 2009/028177 A1 | 3/2009 |

OTHER PUBLICATIONS

International Search Report (PCT/ISA/210) issued on Dec. 14, 2010, by the Japanese Patent Office as the International Searching Authority for International Application No. PCT/JP2010/006696.

* cited by examiner

*Primary Examiner* — Hoa V Le
(74) *Attorney, Agent, or Firm* — Buchanan Ingersoll & Rooney PC

(57) ABSTRACT

Disclosed is a binder resin for a toner containing at least a carboxyl group-containing vinyl resin (C), a glycidyl group-containing vinyl resin (E), a reaction product of the vinyl resins and a saturated crystalline polyester (S), wherein the saturated crystalline polyester (S) has a predetermined melting point and a predetermined metal component (M), and the binder resin for a toner has a predetermined loss modulus (G") and a predetermined storage modulus (G').

18 Claims, No Drawings

BINDER RESIN FOR TONER, TONER AND METHOD FOR PRODUCING SAME

TECHNICAL FIELD

The present invention relates to a binder resin for a toner, a toner and a method for producing the same.

BACKPULVERIZED ART

In general, electrophotography in a PPC (Plain Paper Copy) copier or a printer for transferring a toner image formed on a photo-sensitive material onto recording paper is carried out in the procedure described below. First, an electrostatic latent image is formed on a photo-sensitive material, the latent image is developed by using a toner, the toner image is transferred onto a sheet to be fixed such as paper, and then the transferred toner image is fixed by heating with a heat roll or a film. Since the fixation is carried out under heat in a state that the heat roll or the film is directly in contact with the toner on the sheet to be fixed according to this method, it is performed in a short period of time and with a very high thermal efficiency, thereby achieving a very good fixing efficiency.

However, though having a good thermal efficiency, the heat fixing method has a problem of a so-called offset phenomenon since the toner is contacted with the surface of the heat roll or the film in the melt state. With fast printing speed, so-called low temperature fixing performance for fixing at lower temperatures has been in demand for a toner. However, when low temperature fixing performance is improved, there are problems such that deterioration of so-called storage stability for agglomerating and solidifying the toner over time, and defects in images contaminated by melting and attaching the toner to a photo-sensitive material or the like easily take place. When high-speed printing is carried out, a printed image is rubbed with a roller or paper while the temperature of the toner after printing is not sufficiently lowered during sending of a document or duplex copying, thus easily causing bleeding, stain or the like to the image; and the heat is not fully transferred to the toner and bad fixing properties of the toner is caused, so that such bad fixing properties easily cause bleeding, stain or the like to the image by rubbing with a roller or paper in the same manner.

Accordingly, the toner is required to have a performance so as not to cause deterioration of image quality, so-called smear resistance. Furthermore, when high-speed printing is carried out, the toner tends to be broken due to stirring when the toner is conveyed in the machine, and the broken toner piece is easily attached to a photo-sensitive material or the like which is then stained. A feature so as not to break the toner by stirring, that is, so-called durability, and a feature so as not to stain the photo-sensitive material, that is, so-called resistance to contamination of a photo-sensitive material, have been demanded for a toner.

In order to obtain a resin excellent in the fixing properties and offset resistance, there has been known a resin obtained by using a high molecular weight resin and a low molecular weight resin in mixture and crosslinking a high molecular weight portion. However, sufficient fixing performance and smear resistance could not be obtained from these resins. Furthermore, a composite resin with a different kind of resin for achieving both low temperature fixing properties and offset resistance has been disclosed in various documents (for example, Patent Documents 1 to 4). However, even though these resins are effective in achieving both low temperature fixing properties and offset resistance to some extent, the resins did not exhibit sufficient performance with respect to blocking and contamination of a photo-sensitive material.

Meanwhile, the addition of an amorphous resin, an inorganic fine particle or an organic metal salt to a crystalline polyester resin has been disclosed in various documents (for example, Patent Document 8). According to the document, crystallinity is controlled with the addition of an inorganic fine particle or an organic metal salt, but it is difficult to increase the degree of crystallinity of the crystalline polyester when the compatibility between the crystalline polyester resin and the amorphous resin is not controlled. As a result, satisfactory storage stability has not been obtained.

RELATED DOCUMENT

Patent Document
Patent Document 1: Japanese Patent No. 3532033
Patent Document 2: Japanese Patent No. 3794762
Patent Document 3: Japanese Patent No. 2872347
Patent Document 4: Japanese Patent No. 2931899
Patent Document 5: Japanese Patent No. 3971228
Patent Document 6: Japanese Laid-open Patent Publication No. 2006-171364
Patent Document 7: Japanese Laid-open Patent Publication No. 2008-102390
Patent Document 8: Japanese Laid-open Patent Publication No. 2007-127828
Patent Document 9: Japanese Laid-open Patent Publication No. 2007-71993

DISCLOSURE OF THE INVENTION

The present invention is to solve the problems in the conventional toners, and to provide a binder resin for a toner and a toner excellent in low temperature fixing properties, offset resistance, smear resistance, storage stability, durability and resistance to contamination of a photo-sensitive material.

That is, the present invention includes the following inventions.

[1] A binder resin for a toner containing a carboxyl group-containing vinyl resin (C), a glycidyl group-containing vinyl resin (E), a reaction product of the vinyl resins and a saturated crystalline polyester (S), wherein said saturated crystalline polyester (S) has a melting point of equal to or more than 75 degrees centigrade and equal to or less than 120 degrees centigrade, a metal component (M) selected from Zn, Ca, Mg, Al and Ba (however, excluding metal oxide) is dispersed in the saturated crystalline polyester (S), and the loss modulus (G") of said binder resin for a toner at 120 degrees centigrade is equal to or more than $0.3 \times 10^4$ Pa and equal to or less than $2.7 \times 10^4$ Pa at a measurement frequency of 6.28 rad/sec, and the minimum value of the storage modulus (G') at equal to or more than 50 degrees centigrade and equal to or less than 200 degrees centigrade is equal to or more than $1.0 \times 10^2$ Pa and equal to or less than $1.5 \times 10^4$ Pa.

[2] The binder resin for a toner according to [1], wherein the metal component (M) is contained in an amount of equal to or more than 0.011 mass % and equal to or less than 1 mass %, based on the total weight of 100 mass % of the carboxyl group-containing vinyl resin (C), the glycidyl group-containing vinyl resin (E), a reaction product of the vinyl resins and the saturated crystalline polyester (S).

[3] The binder resin for a toner according to [1] or [2], wherein the metal component (M) is derived from an organic metal salt.

[4] The binder resin for a toner according to any one of [1] to [3], wherein the metal component (M) is derived from a fatty acid metal salt represented by the following general formula,

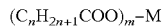

wherein, in the formula, n is an integer of 11 to 22; m is an integer of 2 to 3; and M is a metal selected from Zn, Ca, Mg, Al and Ba.

[5] The binder resin for a toner according to any one of [1] to [4], having one peak of the loss modulus (G") at equal to or more than 70 degrees centigrade and equal to or less than 85 degrees centigrade at a measurement frequency of 6.28 rad/sec.

[6] The binder resin for a toner according to any one of [1] to [5], containing a releasing agent having a melting point at equal to or less than the melting point of the saturated crystalline polyester (S).

[7] The binder resin for a toner according to [6], wherein the melting point of the releasing agent is equal to or more than −50 degrees centigrade and equal to or less than 0 degree centigrade based on the melting point of the saturated crystalline polyester (S), and the releasing agent is contained in an amount of equal to or more than 1 mass % and equal to or less than 10 mass %, based on the total weight of 100 mass % of the carboxyl group-containing vinyl resin (C), the glycidyl group-containing vinyl resin (E), a reaction product of the vinyl resins, and the saturated crystalline polyester (S).

[8] The binder resin for a toner according to any one of [1] to [7], wherein the saturated crystalline polyester (S) is obtained by subjecting an alcohol component selected from aliphatic diols having 2 to 4 carbon atoms and a carboxylic acid component selected from aliphatic dicarboxylic acids having 4 to 6 carbon atoms to polycondensation.

[9] The binder resin for a toner according to any one of [1] to [8], wherein the saturated crystalline polyester (S) is contained in an amount of equal to or more than 1 mass % and equal to or less than 25 mass %, based on the total weight of 100 mass % of the carboxyl group-containing vinyl resin (C), the glycidyl group-containing vinyl resin (E), a reaction product of the vinyl resins and the saturated crystalline polyester (S).

[10] The binder resin for a toner according to any one of [1] to [9], wherein the saturated crystalline polyester (S) has a main peak in the molecular weight region of equal to or more than 5,000 and equal to or less than 15,000 in the molecular weight distribution measured by gel permeation chromatography (GPC) of the chloroform soluble content, and the acid value of the saturated crystalline polyester (S) is equal to or more than 25 mgKOH/g and equal to or less than 70 mgKOH/g.

[11] The binder resin for a toner according to any one of [1] to [10], wherein the tetrahydrofuran (THE) soluble content in the binder resin for a toner has a main peak in the molecular weight region of equal to or more than 3,000 and less than 25,000 in the molecular weight distribution measured by gel permeation chromatography (GPC), the THF insoluble content in the binder resin for a toner is contained in an amount of equal to or more than 3 mass % and less than 30 mass %, and the acid value of the binder resin for a toner is equal to or more than 4.5 mgKOH/g and equal to or less than 30 mgKOH/g.

[12] The binder resin for a toner according to any one of [1] to [11], wherein the carboxyl group-containing vinyl resin (C) contains a high molecular weight vinyl resin (H) in which the THF soluble content has a peak in the molecular weight region of equal to or more than 150,000 and less than 350,000 in the chromatogram obtained by GPC and a low molecular weight vinyl resin (L) in which the THF soluble content has a peak in the molecular weight region of equal to or more than 3,000 and less than 25,000 in the chromatogram obtained by GPC, the mass ratio (H/L) of the high molecular weight vinyl resin (H) to the low molecular weight vinyl resin (L) in the carboxyl group-containing vinyl resin (C) is equal to or more than 10/90 and equal to or less than 50/50, the acid value of the carboxyl group-containing vinyl resin (C) is equal to or more than 3 mgKOH/g and equal to or less than 25 mgKOH/g, the THF soluble content of the glycidyl group-containing vinyl resin (E) has a peak in the molecular weight region of equal to or more than 30,000 and equal to or less than 70,000 in the chromatogram obtained by GPC and the epoxy value is equal to or more than 0.003 Eq/100 g and equal to or less than 0.100 Eq/100 g, and the mass ratio (C/E) of the carboxyl group-containing vinyl resin (C) to the glycidyl group-containing vinyl resin (E) is equal to or more than 87/13 and equal to or less than 99/1.

[13] A toner containing a binder resin for a toner and a coloring agent, wherein the loss modulus (G") at 120 degrees centigrade is equal to or more than $0.3 \times 10^4$ Pa and equal to or less than $2.7 \times 10^4$ Pa at a measurement frequency of 6.28 rad/sec, the minimum value of the storage modulus (G') at equal to or more than 50 degrees centigrade and equal to or less than 200 degrees centigrade is equal to or more than $1.0 \times 10^2$ Pa and equal to or less than $1.5 \times 10^4$ Pa, and the aforementioned binder resin for a toner is the binder resin for a toner according to any one of [1] to [12].

[14] The toner according to [13], having one peak of the loss modulus (G") at equal to or more than 70 degrees centigrade and equal to or less than 85 degrees centigrade at a measurement frequency of 6.28 rad/sec.

[15] The toner according to [13] or [14], wherein the tetrahydrofuran (THF) soluble content of the toner has a main peak in the molecular weight region of equal to or more than 2,000 and less than 25,000 in the molecular weight distribution measured by gel permeation chromatography (GPC), and the THF insoluble content derived from the binder resin for a toner is contained in an amount of equal to or more than 3 mass % and less than 30 mass %.

[16] A method for producing a binder resin for a toner, including:

a step of obtaining a mixture with the addition of an organic metal salt to a saturated crystalline polyester (S), and a step of mixing the obtained mixture, a carboxyl group-containing vinyl resin (C) and a glycidyl group-containing vinyl resin (E).

[17] A method for producing a toner including:

a step of obtaining a binder resin for a toner, and a step of mixing the binder resin for a toner and a coloring agent, in which the binder resin for a toner is obtained according to the production method according to [16].

EFFECT OF THE INVENTION

According to the present invention, there are provided a binder resin for a toner and a toner excellent in low temperature fixing properties, offset resistance, smear resistance, storage stability, durability and resistance to contamination of a photo-sensitive material.

DESCRIPTION OF EMBODIMENTS

The present invention will be described in detail below.

In the present invention, the term "polymerization" may include the meaning of copolymerization, and the term "polymer" may have the meaning of a copolymer. Furthermore, "to" may include both the upper limit and the lower limit otherwise mentioned specifically.

Carboxyl Group-containing Vinyl Resin (C)

For the carboxyl group-containing vinyl resin (C), the acid value of is preferably from 3 to 25 mgKOH/g, more preferably from 3 to 20 mgKOH/g and further preferably 4 to 19 mgKOH/g. When the acid value is lower than 3 mgKOH/g, the reaction with the glycidyl group-containing vinyl resin (E) to be described below hardly proceeds and as a result, deterioration of offset resistance easily occurs when it is used for a toner, and fixing properties are further easily hindered by the unreacted high molecular weight vinyl resin (H). When the acid value exceeds 25 mgKOH/g, the reaction with the glycidyl group-containing vinyl resin (E) proceeds too far, the crosslinking component obtained by the reaction of the carboxyl group-containing vinyl resin (C) with the glycidyl group-containing vinyl resin (E) is excessively phase-separated from the non-crosslinking component, and deterioration of offset resistance which is considered to be caused by the crosslinking component having no effect on offset resistance occurs in some cases. Incidentally, in the present invention, the acid value refers to mg of potassium hydroxide necessary to neutralize 1 g of the resin.

It is preferable that the carboxyl group-containing vinyl resin (C) contains the high molecular weight vinyl resin (H) in which the THF soluble content has a peak in the molecular weight region of equal to or more than 150,000 and less than 350,000 in the chromatogram obtained by GPC and the low molecular weight vinyl resin (L) in which the THF soluble content has a peak in the molecular weight region of equal to or more than 3,000 and less than 25,000 in the chromatogram obtained by GPC. The peak mentioned herein indicates a main peak.

When the carboxyl group-containing vinyl resin (C) is composed of the high molecular weight vinyl resin (H) and the low molecular weight vinyl resin (L), the ratio (H/L) is preferably from 10/90 to 50/50 from the viewpoint of an overall balance among fixing properties, offset resistance, smear resistance and durability of the toner. The ratio (H/L) is more preferably from 10/90 to 45/55. When the ratio of the high molecular r weight vinyl resin (H) is lower than 10 mass %, durability and offset resistance are deteriorated in some cases when it is used for a toner. When it exceeds 50 mass %, fixing properties and smear resistance of the toner are deteriorated in some cases.

As the monomer constituting the carboxyl group-containing vinyl resin (C), there may be exemplified styrene monomers, acrylic monomers (including methacrylic monomers as well; hereinafter the same), in addition to the carboxyl group-containing monomers.

Here, examples of the styrene monomer to be used in the present invention include styrene, p-methylstyrene, m-methylstyrene, o-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene and the like. Particularly preferably used is styrene.

Examples of the acrylic monomer to be used in the present invention include acrylic esters such as methyl acrylate, ethyl acrylate, propyl acrylate, butyl acrylate, octyl acrylate, cyclohexyl acrylate, stearyl acrylate, benzyl acrylate, furfuryl acrylate, hydroxyethyl acrylate, hydroxybutyl acrylate, dimethylaminomethyl acrylate, dimethylaminoethyl acrylate; methacrylic esters such as methyl methacrylate, ethyl methacrylate, propyl methacrylate, butyl methacrylate, octyl methacrylate, cyclohexyl methacrylate, stearyl methacrylate, benzyl methacrylate, furfuryl methacrylate, hydroxyethyl methacrylate, hydroxybutyl methacrylate, dimethylaminomethyl methacrylate, dimethylaminoethyl methacrylate; amides such as acrylamide, methacrylamide, N-substituted acrylamide, N-substituted methacrylamide; acrylonitrile; methacrylonitrile; and the like. Among these, preferably used are acrylic esters, methacrylic esters, acrylonitrile and methacrylonitrile. Particularly preferably used are butyl acrylate, methyl methacrylate, butyl methacrylate and hydroxyethyl acrylate.

In the present invention, in addition to the aforementioned monomers, there may also be used diesters of an unsaturated dibasic acid such as dimethyl fumarate, dibutyl fumarate, dioctyl fumarate, dimethyl maleate, dibutyl maleate, dioctyl maleate as monomers.

Examples of the carboxyl group-containing monomer in the present invention include acrylic acid, methacrylic acid, maleic anhydride, maleic acid, fumaric acid, cinnamic acid, mono esters of unsaturated dibasic acids such as methyl fumarate, ethyl fumarate, propyl fumarate, butyl fumarate, octyl fumarate, methyl maleate, ethyl maleate, propyl maleate, butyl maleate, octyl maleate and the like. Preferably used are acrylic acid, methacrylic acid, fumaric acid, methyl fumarate, ethyl fumarate, propyl fumarate, butyl fumarate and octyl fumarate. Particularly preferably used are acrylic acid and methacrylic acid.

For the carboxyl group-containing vinyl resin (C) in the present invention, a crosslinkable monomer having two or more double bonds as necessary may be used as a monomer. Examples of the crosslinkable monomer include aromatic divinyl compounds such as divinyl benzene, divinyl naphthalene; diacrylate compounds and methacrylate compounds thereof such as ethylene glycol diacrylate, 1,3-butylene glycol diacrylate, 1,4-butanediol diacrylate, 1,5-pentanediol diacrylate, 1,6-hexanediol diacrylate, neopentylglycol diacrylate, diethylene glycol diacrylate, triethylene glycol diacrylate, tetraethylene glycol diacrylate, polyoxyethylene (2)-2,2-bis(4-hydroxyphenyl)propane diacrylate, polyoxyethylene(4)-2,2-bis(4-hydroxyphenyl)propane diacrylate; and polyfunctional crosslinkable monomers and methacrylate compounds thereof such as pentaerythritol triacrylate, trimethylolethane triacrylate, trimethylolpropane triacrylate, tetramethylolmethane tetraacrylate.

When these polyfunctional crosslinkable monomers are used, the crosslinkable monomer is preferably contained in an amount of less than 0.5 mass % based on 100 mass % of monomers other than polyfunctional crosslinkable monomers contained in the carboxyl group-containing vinyl resin (C). When the amount is equal to or more than 0.5 mass %, the crosslinked body created by the reaction of the carboxyl group with the glycidyl group to be described below is cut in the production of a toner in some cases. The reason is considered that the crosslinked portion by the polyfunctional crosslinkable monomer is brittle to kneading shear in the production of a toner so that the crosslinked body is cut, and starting from the cut crosslinked portion due to the polyfunctional crosslinkable monomer, scission of other crosslinked portions is accelerated.

In the present invention, as a method for producing a carboxyl group-containing vinyl resin (C), there can be adopted any of known polymerization methods such as solution polymerization, bulk polymerization, suspension polymerization, emulsion polymerization, or a combination thereof. Solution polymerization, bulk polymerization and the combination of solution polymerization and bulk polymerization are suitably adopted from the viewpoints of adjustment of the molecular weight distribution, mixing properties of the high molecular weight vinyl resin (H) and the low molecular weight vinyl resin (L) to be described later, and convenience of distribution adjustment of the carboxyl group and the glycidyl group.

The carboxyl group-containing vinyl resin (C) of the present invention can be obtained by polymerizing each of the high molecular weight vinyl resin (H) and the low molecular weight vinyl resin (L) alone in advance, and then mixing the respective resins in the melt state or the solution state. Further, it can be obtained by polymerizing any one of the high molecular weight vinyl resin (H) or the low molecular weight vinyl resin (L) alone, and then polymerizing the other vinyl resin in the presence of the former vinyl resin.

Examples of the solvent used for solution polymerization include aromatic hydrocarbon solvents such as benzene, toluene, ethylbenzene, xylene, cumene. These solvents may be used alone or a mixture thereof may be used, and preferably used is xylene.

Polymerization may be carried out by using a polymerization initiator or so-called thermal polymerization may be carried out without using a polymerization initiator. As a polymerization initiator, any polymerization initiators can be usually used as far as they can be used as radical polymerization initiators. Examples thereof include azo initiators such as 2,2'-azobisisobutyronitrile, 2,2'-azobis(4-methoxy-2,4-dimethylvaleronitrile), dimethyl-2,2'-azobisisobutyrate, 1,1'-azobis(1-cyclohexanecarbonitrile), 2-(carbamoylazo)-isobutyronitrile, 2,2'-azobis(2,4,4-trimethylpentane), 2-phenylazo-2,4-dimethyl-4-methoxyvaleronitrile, 2,2'-azobis(2-methyl-propane); ketone peroxides such as methylethylketone peroxide, acetylacetone peroxide, cyclohexanone peroxide; peroxy ketals such as 1,1-bis(t-butylperoxy)-3,3,5-trimethylcyclohexane, 1,1-bis(butylperoxy)cyclohexane, 2,2-bis(t-butylperoxy)butane and the like; hydroperoxides such as t-butyl hydroperoxide, cumene hydroperoxide, 1,1,3,3-tetramethylbutyl hydroperoxide; dialkyl peroxides such as di-t-butyl peroxide, t-butylcumyl peroxide, dicumyl peroxide, 2,5-dimethyl-2,5-di(t-butylperoxy)hexane, $\alpha,\alpha'$-bis(t-butylperoxyisopropyl)benzene; diacyl peroxides such as isobutyryl peroxide, octanoyl peroxide, decanoyl peroxide, lauroyl peroxide, 3,5,5-trimethylhexanoyl peroxide, benzoyl peroxide, m-toluoyl peroxide; peroxydicarbonates such as diisopropyl peroxydicarbonate, di-2-ethylhexyl peroxydicarbonate, di-n-propyl peroxydicarbonate, di-2-ethoxyethyl peroxydicarbonate, di-methoxyisopropyl peroxydicarbonate, di(3-methyl-3-methoxybutyl)peroxydicarbonate; sulfonyl peroxides such as acetylcyclohexyl sulfonyl peroxide; and peroxyesters such as t-butyl peroxyacetate, t-butyl peroxyisobutyrate, t-butyl peroxyneodecanoate, cumyl peroxyneodecanoate, t-butyl peroxy-2-ethylhexanoate, t-butyl peroxy laurate, t-butyl peroxy benzoate, t-butyl peroxy isopropyl carbonate, di-t-butyldiperoxy isophthalate. These initiators may be used singly or two or more kinds thereof may be used in combination.

The type and amount of the polymerization initiator may be properly selected depending on the reaction temperature, concentration of the monomer and the like. The polymerization initiator is usually used in an amount of 0.01 to 10 mass % per 100 mass % of the monomer in use.

The carboxyl group-containing vinyl resin (C) may contain a block copolymer consisting of a block having a sequence of the ethylenic hydrocarbon-derived constituent units and/or the conjugated diene hydrocarbon-derived constituent units and a block having a sequence of the styrene-derived constituent units, and/or the hydrogenated block copolymer, that is, the hydrogenated product of the block copolymer.

The content of the block copolymer and the hydrogenated block copolymer is preferably equal to or more than 0.05 mass % and equal to or less than 1.5 mass %, and more preferably equal to or more than 0.1 mass % and equal to or less than 1.0 mass %, based on 100 mass % of the carboxyl group-containing vinyl resin (C). When the content is within the above range, the releasing agent may be dispersed in the binder resin without impairing storage stability, fluidity and the like of the toner. Therefore, a toner excellent in resistance to contamination of a photo-sensitive material is easily achieved.

In order to obtain these block copolymers, there may generally be used one or more kinds selected from ethylenic hydrocarbons such as ethylene, propylene, 1-butene, 2-butene, isobutylene, 1-pentene, 2-pentene, 2-methyl-1-butene, 3-methyl-1-butene, 2-methyl-2-butene, 1-hexene, 2,3-dimethyl-2-butene; and conjugated diene hydrocarbons such as butadiene, isoprene. The block copolymer is produced by using a reactive group of a block copolymer obtained in accordance with a known living anionic polymerization or a living cationic polymerization, and then blocking this reactive group with styrene. However, the production method is not restricted thereto and other conventionally known methods may also be employed. In addition, some kinds of the aforementioned block copolymers have unsaturated double bonds; at that time, the block copolymer may be used as a hydrogenated product obtained by reacting the unsaturated double bonds of the block copolymer with hydrogen in accordance with a known method.

Examples of a commercial product used for the aforementioned block copolymer include Kraton (styrene-ethylene/butylene-styrene block copolymer (SEM), styrene-butadiene-styrene block copolymer, styrene-isoprene-styrene block copolymer, styrene-ethylene/propylene-styrene block copolymer or styrene-ethylene/propylene block copolymer) produced by Kraton Performance Polymers, Inc., Septon (styrene-ethylene/propylene block copolymer or hydrogenated styrene-isoprene block copolymer) produced by Kuraray Co., Ltd. and Tufprene (styrene-butadiene block copolymer) produced by Asahi Kasei Co., Ltd. and the like.

High Molecular Weight Vinyl Resin (H)

In the present invention, the high molecular weight vinyl resin (H) contains the THF soluble content having a peak preferably in the molecular weight region of equal to or more than 150,000 and less than 350,000 and more preferably in the molecular weight region of equal to or more than 160,000 and less than 300,000 in the chromatogram obtained by GPC. It is preferable because a balance among excellent fixing properties, offset resistance and durability is realized. When the peak molecular weight is less than 150,000, resin strength is not sufficient and durability is deteriorated when it is used for a toner. Furthermore, in the formation of a crosslinked body by the reaction with the glycidyl group to be described below, the formation of the crosslinked body is not sufficiently achieved and offset resistance is deteriorated in some cases. When the peak molecular weight is equal to or more than 350,000, the viscosity of the binder resin is easily increased by the reaction with the glycidyl group-containing vinyl resin. However, when it is adjusted to the proper range of the viscoelasticity of the toner, unreacted high molecular weight vinyl resin easily remains in large quantities, and unreacted high molecular weight vinyl resin causes deterioration of fixing properties in some cases.

For the high molecular weight vinyl resin (H), the acid value (AVH) is preferably from 3 to 30 mgKOH/g and more preferably from 5 to 28 mgKOH/g. It is preferable because a balance between fixing properties and offset resistance is realized. When the acid value is lower than 3 mgKOH/g, the reaction with the glycidyl group-containing vinyl resin to be described later hardly takes place and offset resistance of the toner is deteriorated in some cases. When the acid value exceeds 30 mgKOH/g, the reaction with the glycidyl group-containing vinyl resin excessively takes place and the viscosity of the binder resin is excessively increased and as a result, the loss modulus in the fixing temperature region of the toner becomes excessively high and the fixing performance is deteriorated in some cases.

The high molecular weight vinyl resin (H) may not necessarily be a single polymer, or two or more high molecular weight vinyl resins may be used. In that case, the high molecular weight vinyl resin (H) may preferably satisfy the aforementioned characteristics as a whole. Further, to produce a single polymer, the carboxyl group-containing monomer is added in the middle of polymerization or added separately at the beginning and end of polymerization, whereby, in the polymer, a portion having a higher carboxyl group content and a portion having a smaller carboxyl group content may be deliberately divided.

Low Molecular Weight Vinyl Resin (L)

In the present invention, the low molecular weight vinyl resin (L) contains the THF soluble content having a peak preferably in the molecular weight region of equal to or more than 3,000 and less than 25,000, and more preferably in the molecular weight region of equal to or more than 4,000 and less than 22,000 in the chromatogram obtained by GPC. It is preferable because excellent fixing performance is obtained. When the peak molecular weight is less than 3,000, storage stability and durability of the toner are easily adversely affected in some cases. When the peak molecular weight is equal to or more than 25,000, fixing performance and smear resistance are deteriorated in some cases.

For the low molecular weight vinyl resin (L), the acid value (AVL) is preferably from 2 to 20 mgKOH/g and further preferably from 3 to 18 mgKOH/g. It is preferable because excellent fixing performance and offset resistance performance are exhibited. When the acid value (AVL) is lower than 2 mgKOH/g, the compatibility with the high molecular weight vinyl resin (H) is extremely deteriorated and deterioration of durability or very fine offset occurs in some cases. When the acid value is higher than 20 mgKOH/g, increased reactivity with the glycidyl group-containing vinyl resin (E) substantially hinders the reaction of the glycidyl group-containing vinyl resin (E) with the high molecular weight vinyl resin (H) and the low molecular weight vinyl resin (L) itself becomes a high molecular weight resin, thus deteriorating offset resistance or deteriorating fixing properties and smear resistance in some cases.

The low molecular weight vinyl resin (L) necessarily has the above characteristics, but it may not be necessarily a single polymer, or two or more low molecular weight vinyl resins may be used. In that case, the low molecular weight vinyl resin (L) may preferably satisfy the aforementioned characteristics as a whole. Further, to produce a single polymer, the carboxyl group-containing monomer is added in the middle of polymerization or added separately at the beginning and end of polymerization, whereby, in the polymer, a portion having a higher carboxyl group content and a portion having a smaller carboxyl group content may be deliberately divided.

Glycidyl Group-Containing Vinyl Resin (E)

The glycidyl group-containing vinyl resin (E) in the present invention is obtained by a known polymerization method employing at least one of styrene monomers and acrylic monomers (including methacrylic monomers as well) and at least one of glycidyl group-containing monomers.

As the styrene monomers and acrylic monomers (including methacrylic monomers as well) in the present invention, there may be exemplified the monomers described in the carboxyl group-containing vinyl resin (C).

Examples of the glycidyl group-containing monomer in the present invention include glycidyl acrylate, β-methyl glycidyl acrylate, glycidyl methacrylate, β-methyl glycidyl methacrylate and the like, and preferably used are glycidyl methacrylate and β-methyl glycidyl methacrylate.

The glycidyl group-containing vinyl resin (E) contains the THF soluble content having a peak preferably in the molecular weight region of equal to or more than 30,000 and equal to or less than 70,000, and more preferably in the molecular weight region of equal to or more than 30,000 and equal to or less than 60,000 in the chromatogram obtained by GPC. Furthermore, the epoxy value is preferably from 0.003 to 0.100 Eq/100 g, and more preferably from 0.003 to 0.080 Eq/100 g. When the peak molecular weight and the epoxy value of the glycidyl group-containing vinyl resin (E) are equal to or more than the above lower limit, the durability becomes excellent when it is used for a toner and so-called feature of maintaining development is enhanced. Herein, the feature of maintaining development refers to a feature of a printed image quality which is not reduced by toner breakdown during continuous printing over a long period of time. Furthermore, at the same time, by the reaction of the carboxyl group-containing vinyl resin (C) with the glycidyl group-containing vinyl resin (E), the molecular weight of the high molecular weight component is further increased and appropriate elasticity is imparted to the binder resin, and offset resistance performance becomes excellent. When the peak molecular weight is excessively low or the epoxy value is excessively low, the elasticity of the binder resin is not sufficient and offset resistance becomes deteriorated in some cases. On the other hand, when the peak molecular weight is excessively high or the epoxy value is excessively high, the elasticity of the binder resin becomes excessively high, and fixing properties and smear resistance are deteriorated in some cases.

In the present invention, the epoxy value refers to mole of the epoxy group present in 100 g of the resin, and it may be measured in accordance with JIS K-7236.

The glycidyl group-containing vinyl resin (E) may not necessarily be a single polymer, or two or more glycidyl group-containing vinyl resins may be used. In that case, the glycidyl group-containing vinyl resin (E) may preferably satisfy the above characteristics as a whole. Further, to produce a single polymer, the glycidyl group-containing monomer is added in the middle of polymerization or added separately at the beginning and end of polymerization, whereby in the polymer, a portion having a higher carboxyl group content and a portion having a smaller carboxyl group content may be deliberately divided.

Saturated Crystalline Polyester (S)

It is preferable that the saturated crystalline polyester (S) in the present invention is obtained by subjecting an alcohol component selected from aliphatic diols having 2 to 4 carbon atoms and a carboxylic acid component selected from aliphatic dicarboxylic acid having 4 to 6 carbon atoms to polycondensation.

Examples of the alcohol component selected from aliphatic diols having 2 to 4 carbon include ethylene glycol and 1,4-butanediol. Examples of the carboxylic acid component selected from aliphatic dicarboxylic acids having 4 to 6 carbon atoms include succinic acid, adipic acid, and their acid anhydrides or alkyl ester.

Meanwhile, for the purpose of adjusting the acid value or the hydroxyl value of the saturated crystalline polyester (S), there may be used aliphatic monocarboxylic acid such as octanoic acid, decanoic acid, dodecanoic acid, myristic acid, palmitic acid, stearic acid; or aliphatic monoalcohol such as octanol, decanol, dodecanol, myristyl alcohol, palmityl alcohol, stearyl alcohol in the ranges in which physical properties are not impaired.

With the use of the alcohol component selected from aliphatic diols having 2 to 4 carbon atoms and the carboxylic acid component selected from aliphatic dicarboxylic acids having 4 to 6 carbon atoms, the ester group concentration of the saturated crystalline polyester (S) becomes high and hydrophilicity is increased, and the saturated crystalline polyester (S) hardly dissolve in the carboxyl group-containing vinyl resin (C) or the glycidyl group-containing vinyl resin (E). Namely, the saturated crystalline polyester (S) is hardly plasticized. Thus, a toner excellent in storage stability and resistance to contamination of a photo-sensitive material can be obtained. Furthermore, when the crystalline polyester has an unsaturated bond, crystallization tends to be inhibited by the unsaturated bond portion and the amount of the amorphous portion is increased. As a result, an effect of the toner on low temperature fixing properties is lowered, and storage stability and resistance to contamination of a photo-sensitive material are easily deteriorated.

Meanwhile, it is preferable that the saturated crystalline polyester (S) according to the present invention does not contain the carboxylic acid component having a double bond typically represented by fumaric acid and the alcohol component having a double bond as the raw material alcohol component and carboxylic acid component. When the carboxylic acid component having a double bond typically represented by fumaric acid is used, the regularity of the structure is disturbed, a crystal structure of the crystalline polyester resin is hardly formed, and the proportion of the amorphous portion causing stickiness of the toner is increased in some cases. As a result, storage stability of the toner tends to be lowered in some cases. Furthermore, a polyester resin having an unsaturated bond may easily be subjected to a radical polymerization during polycondensation, which easily causes formation of a branched structure or a crosslinked structure to the crystalline polyester resin. This is also considered as one reason to make it difficult to form a crystal structure.

The temperature for carrying out a polycondensation reaction of the saturated crystalline polyester (S) is generally from 120 to 250 degrees centigrade, preferably from 130 to 240 degrees centigrade, and further preferably from 140 to 230 degrees centigrade. When the reaction temperature is less than 120 degrees centigrade, the reaction time is increased so that the productivity is lowered in some cases. When it exceeds 250 degrees centigrade, decomposition of the resin occurs in some cases.

In the polycondensation reaction, the addition of a catalyst is preferable because the reaction proceeds rapidly. As the catalyst, known catalysts for use in the polycondensation reaction may be used. Examples thereof include catalysts containing elements such as tin, antimony, titanium, germanium, aluminum. Examples of the catalyst containing tin include dibutyltin oxide and the like. Examples of the catalyst containing antimony include antimony trioxide and the like. As the catalyst containing titanium, further preferably used are titanium alkoxide, titanium acylate, titanium chelate and the like, and particularly preferably used are tetra-n-butyl titanate, tetra(2-ethylhexyl)titanate, tetramethyl titanate and tetraisopropyl titanate. Examples of the catalyst containing germanium include germanium dioxide and the like.

The amount of the catalyst added is preferably from 0.01 to 0.50 mass parts per 100 mass parts of the monomer. The aforementioned catalyst may be used singly or a plurality of catalysts may be used. Furthermore, the catalyst may be added at the beginning or in the middle of polymerization.

In particular, in order to reduce the environmental load, a catalyst different from the catalyst containing tin or antimony, particularly, the catalyst containing titanium, is preferably used at the time of producing the saturated crystalline polyester (S). As the catalyst containing titanium, the aforementioned compounds may be cited.

Specific product names of those corresponding to the aforementioned catalyst containing titanium include, though not restricted to, Orgatics TA-25 (tetra-n-butyl titanate), TA-30 (tetra(2-ethylhexyl)titanate), TA-70 (tetramethyl titanate) and the like as titanium alkoxide; Orgatics TPHS (polyhydroxy titanium stearate) and the like as titanium acylate; and Orgatics TC-401 (titanium tetra acetylacetonate), TC-200 (titanium octylene glycolate), TC-750 (titanium ethyl aceLoacetate), TC-310 (titanium lactate), TC-400 (titanium triethanol aminate) and the like as titanium chelate (all products are a product of Matsumoto Fine Chemical Co., Ltd.

In the present invention, the saturated crystalline polyester (S) has a main peak in the molecular weight region of equal to or more than 5,000 and equal to or less than 15,000 and preferably equal to or more than 6,000 and equal to or less than 14,000 in the molecular weight distribution measured by gel permeation chromatography (GPC) of the chloroform soluble content. It is preferable from the viewpoints of storage stability, durability and resistance to contamination of a photo-sensitive material. When the peak molecular weight is lower than 5,000, the saturated crystalline polyester (S) easily penetrates into the carboxyl group-containing vinyl resin (C) or the glycidyl group-containing vinyl resin (E). Namely, the saturated crystalline polyester (S) is easily plasticized and as a result, storage stability and resistance to contamination of a photo-sensitive material are deteriorated in some cases. When it is higher than 15,000, dispersibility of the saturated crystalline polyester (S) into the carboxyl group-containing vinyl resin (C) or the glycidyl group-containing vinyl resin (E) and a reaction product of the vinyl resins is deteriorated, the saturated crystalline polyester (S) is dropped when it is used for a toner, and durability is lowered in some cases.

The saturated crystalline polyester (S) in the present invention has an endothermic peak derived from a crystalline melting point at a temperature of equal to or more than 75 degrees centigrade and equal to or less than 120 degrees centigrade, and preferably equal to or more than 80 degrees centigrade and equal to or less than 115 degrees centigrade in the measurement by differential scanning calorimetry (DSC). It is preferable from the viewpoint of a balance among fixing properties, smear resistance and storage stability. When the melting point is lower than 75 degrees centigrade, the saturated crystalline polyester (S) is melted at a lower temperature so that fixing properties and smear resistance are enhanced, but an external additive at a part of the saturated crystalline polyester (S) present on the surface of the toner tends to be embedded and as a result, storage stability is deteriorated in some cases. When the melting point exceeds 120 degrees centigrade, storage stability is improved, but the saturated crystalline polyester (S) is not fully melted when the toner is fixed and an effect on fixing properties is not exhibited in some cases.

The acid value of the saturated crystalline polyester (S) in the present invention is equal to or more than 25 mgKOH/g and equal to or less than 70 mgKOH/g, and preferably equal to or more than 30 mgKOH/g and equal to or less than 65 mgKOH/g. It is preferable from the viewpoint of durability of the toner. When the acid value is lower than 25 mgKOH/g, in the dispersion step of the saturated crystalline polyester (S) in the reaction of the carboxyl group-containing vinyl resin (C) with the glycidyl group-containing vinyl resin (E) to be described later, dispersibility of the saturated crystalline polyester (S) is deteriorated and as a result, the saturated crystalline polyester (S) is dropped and durability of the toner is deteriorated in some cases.

Meanwhile, the structure of the saturated crystalline polyester (S) may be specified by dissolving the saturated crystalline polyester (S) in a poor solvent such as xylene, carrying out thorough hydrolysis of the xylene insoluble component and then separating by distillation or LC, and analyzing by the combination of methods such as gas chromatography (GC) as well as IR, NMR, LC and MS.

In the present invention, the metal component (M) selected from Zn (zinc), Ca (calcium), Mg (magnesium), Al (aluminum) and Ba (barium) (however, excluding metal oxide) is dispersed in the saturated crystalline polyester (S). Since slip effect is not intended by the metal component (M), it is not segregated on the surface layer of the toner such as a metal contained in the external additive as a lubricant. The metal component (M) according to the present invention is dispersed in the saturated crystalline polyester (S).

The metal component (M) according to the present invention present in the saturated crystalline polyester (S) may be confirmed by the following method. That is, in case of the binder resin for a toner, it may be confirmed by carrying out trimming, surface shaping, and then scanning electron microscope (SEM)/X-ray microanalyzer (XMA) mapping analysis at 1,000 to 5,000 magnifications. In case of the toner, it may be confirmed by first covering the toner with an epoxy resin or the like and then carrying out the same operation as in the binder resin.

On the other hand, the metal contained in the external additive which is segregated on the surface layer of the toner may be confirmed by carrying out scanning electron microscope (SEM)/X-ray microanalyzer (XMA) mapping analysis.

The metal component (M) according to the present invention does not contain a metal oxide. That is, the metal component (M) does not contain a metal component contained in the magnetic material.

The metal component (M) according to the present invention and a magnetic material (metal oxide) are distinguished by dissolving a resin or a toner in THF and taking out a magnetic material using a magnet or the like. The metal component contained in the magnetic material taken out may be analyzed by a known method such as X-ray fluorescence (XRF) or the like.

The metal component (M) selected from Zn, Ca, Mg, Al and Ba derived from an organic metal salt may be used for the metal component (M). More specifically, the metal component (M) selected from Zn, Ca, Mg, Al and Ba derived from a fatty acid metal salt represented by the following general formula may be used for the metal component (M).

$$(C_nH_{2n+1}COO)_m-M$$

wherein, in the above general formula, n is an integer of 11 to 22; m is an integer of 2 to 3; and M is preferably a metal selected from Zn, Ca, Mg, Al and Ba. When n is an integer of 11 to 22, an effect of the saturated crystalline polyester (S) as a nucleating agent may be fully exhibited.

Meanwhile, the metal component (M) is contained in an amount of equal to or more than 0.10 mass % and equal to less than 5.0 mass %, preferably equal to or more than 0.10 mass % and equal to less than 2.0 mass %, and more preferably equal to or more than 0.15 mass % and equal to less than 0.95 mass %, based on 100 mass % of the saturated crystalline polyester (S).

The metal component (M) is contained in an amount of preferably equal to or more than 0.011 mass % and equal to less than 1 mass %, more preferably equal to or more than 0.011 mass % and equal to less than 0.15 mass %, and further preferably equal to or more than 0.011 mass % and equal to less than 0.12 mass %, based on the total weight of 100 mass % of the carboxyl group-containing vinyl resin (C), the glycidyl group-containing vinyl resin (E), a reaction product of the vinyl resins and the saturated crystalline polyester (S).

The weight of the metal component (M) in the binder resin for a toner or the toner of the present invention may be measured by a known analysis method such as XRF.

When the metal component (M) derived from a fatty acid metal salt is contained in the above range, a toner excellent in offset resistance, storage stability, durability and resistance to contamination of a photo-sensitive material can be obtained. Furthermore, since the fatty acid metal salt is not soluble in the saturated crystalline polyester (S), the fatty acid metal salt is present in the saturated crystalline polyester (S) as a domain and such a portion functions as a crystalline nucleating agent, thus accelerating crystallization. Therefore, the amorphous portion causing stickiness which is present in the saturated crystalline polyester (S) and has a very low glass transition temperature (Tg) is reduced so that a toner excellent in storage stability is obtained.

When a fatty acid metal salt is not contained, and the saturated crystalline polyester (S) which is once melted during fixation of the toner is cooled and solidified, the degree of crystallinity is lowered, the fixed toner is softened, and smear resistance is deteriorated. However, since the crystallization speed is improved during cooling with the addition of the fatty acid metal salt, softening is prevented and smear resistance is improved.

Furthermore, the aforementioned fatty acid metal salt functions as a catalyst in the reaction process of the carboxyl group-containing vinyl resin (C) with the glycidyl group-containing vinyl resin (E) to be described below. When the saturated crystalline polyester (S) contains a fatty acid metal salt, in the reaction process of the carboxyl group-containing vinyl resin (C) with the glycidyl group-containing vinyl resin (E), the reaction of the carboxyl group-containing vinyl resin (C) with the glycidyl group-containing vinyl resin (E) is accelerated in the vicinity of an interface between the saturated crystalline polyester (S) and both vinyl resins, and a kneading shear acts on the saturated crystalline polyester (S) efficiently. Thus, the saturated crystalline polyester (S) is easily dispersed in the carboxyl group-containing vinyl resin (C), the glycidyl group-containing vinyl resin (E) and a reaction product thereof, and the saturated crystalline polyester (S) is hardly dropped from the toner. So, there is obtained a toner exhibiting excellent durability and excellent offset resistance as well because the formation of a crosslinked body tends to progress.

Meanwhile, the production process of the binder resin of the present invention includes a reaction process of the carboxyl group-containing vinyl resin (C) with the glycidyl group-containing vinyl resin (E). However, in general, styrene is easily generated as a volatile component by depolymerization as a vinyl resin containing styrene as a raw material is heated at a higher temperature, so that the volatile component such as styrene or the like tends to be increased as long as the reaction temperature is high. However, with the addition of the aforementioned fatty acid metal salt, the volatile component such as styrene or the like generated in the course of production of the binder resin may be reduced, and finally the volatile component contained in the toner may also be reduced. It is considered that this is caused by the fact that the crosslinking reaction is promoted with the addition of the fatty acid metal salt, whereby the crosslinking reaction is fully carried out even though the kneading temperature is lowered. As described below, the minimum value of the storage modulus (G') at 50 to 200 degrees centigrade becomes higher as compared to the case in which a fatty acid metal salt is not added, so that it is assumed that a performance of accelerating the crosslinking reaction is remarkably improved by the addition of the fatty acid metal salt.

As described above, first, an organic metal salt (aforementioned fatty acid metal salt) is added to the saturated crystalline polyester (S) to obtain a mixture. Thereafter, it is preferable that the obtained mixture, the carboxyl group-containing vinyl resin (C) and the glycidyl group-containing vinyl resin (E) are mixed.

The reaction of the carboxyl group-containing vinyl resin (C) with the glycidyl group-containing vinyl resin (E) is carried out at a low temperature by the action of the catalyst, thus enabling dispersion without lowering the degree of crystallinity of the saturated crystalline polyester (S), so that storage stability of the toner is improved.

Examples of the fatty acid metal salt in the present invention include Zn salt, Ca salt, Mg salt, Al salt, Ba salt and the like of lauric acid, myristic acid, palmitic acid, stearic acid and behenic acid. Particularly preferably used is zinc stearate.

For the fatty acid metal salt in the saturated crystalline polyester (S), preferably used is a method in which polyester is heated at a temperature of equal to or more the melting point and equal to or less than 200 degrees centigrade, and then a fatty acid metal salt is added and dispersed with stirring.

In the present invention, the amount of the saturated crystalline polyester (S) added is preferably equal to or more than 1 mass % and equal to or less than 25 mass %, and further preferably equal to or more than 3 mass % and equal to or less than 23 mass %, based on the total weight of 100 mass % of the carboxyl group-containing vinyl resin (C), the glycidyl group-containing vinyl resin (E), a reaction product of the vinyl resins and the saturated crystalline polyester (S). It is preferable from the viewpoint of an overall balance among low temperature fixing properties, offset resistance, smear resistance, storage stability, durability and resistance to contamination of a photo-sensitive material. When the amount added is smaller than the lower limit, low temperature fixing properties and smear resistance are deteriorated, the reaction of the carboxyl group-containing vinyl resin (C) with the glycidyl group-containing vinyl resin (E) to be described below is not accelerated, and offset resistance is deteriorated in some cases. When the amount added is higher than the upper limit, storage stability, durability and resistance to contamination of a photo-sensitive material are deteriorated in some cases.

Releasing Agent

As the releasing agent which may be used for the present invention, there may be used conventionally known releasing agents having a melting point at equal to or more than −50 degrees centigrade and equal to or less than 0 degree centigrade, based on the melting point of the saturated crystalline polyester (S), and satisfying the condition of the melting point of equal to or more than 60 degrees centigrade and equal to or less than 120 degrees centigrade.

Examples of the aforementioned releasing agent include aliphatic hydrocarbon wax such as low molecular weight polyethylene, low molecular weight polypropylene, polyolefin copolymer, polyolefin wax, paraffin wax, microcrystalline wax, Fisher-Tropsch wax; oxides of aliphatic hydrocarbon wax such as oxidized polyethylene wax; vegetable wax such as candelilla wax, carnauba wax, Japan wax, rice wax and jojoba wax; animal wax such as bee wax, lanoline and whale wax; mineral wax such as ozokerite, ceresine and petrolatum; wax principally constituted of aliphatic esters such as montan ester wax and castor wax; and totally or partially deacidified aliphatic esters such as deacidified carnauba wax. Further, examples include saturated linear aliphatic acids such as palmitic acid, stearic acid and montanic acid or long-chain alkyl carboxylic acids having a long-chain alkyl group; unsaturated aliphatic acids such as brassidic acid, eleostearic acid and parinaric acid; saturated alcohols such as stearyl alcohol, eicosyl alcohol, behenyl alcohol, carnaubyl alcohol, ceryl alcohol and melissyl alcohol, or long-chain alkyl alcohol having a long-chain alkyl group; polyhydric alcohols such as sorbitol; aliphatic acid amides such as linoleic amide, oleic amide and lauric amide; saturated aliphatic acid bisamides such as methylene bis stearamide, ethylene bis capramide, ethylene bis lauramide and hexamethylene bis stearamide; unsaturated aliphatic acid amides such as ethylene bis oleamide, hexamethylene bis oleamide, N,N'-dioleyl adipamide and N,N'-dioleyl sebacamide; aromatic based bisamides such as m-xylene bis stearamide and N,N'-distearyl isophthalamide; wax formed by grafting vinyl monomers such as styrene based monomers, acrylic based monomers, carboxyl group-containing monomers and glycidyl group-containing monomers to aliphatic hydrocarbon wax; partially esterified compounds of fatty acids and polyhydric alcohol such as behenic acid monoglyceride; and methyl ester compounds having a hydroxyl group obtained by hydrogenating vegetable oils and fats. Further, examples include wax having functional groups such as a hydroxyl groups, ester groups, carboxyl groups obtained by liquid-phase oxidation of higher aliphatic hydrocarbon having one or more double bonds obtained by an ethylene polymerization method or an olefination method by pyrolysis of petroleum hydrocarbons or an n-paraffin mixture obtained from petroleum fraction or polyethylene wax obtained by an ethylene polymerization method or higher aliphatic hydrocarbon obtained by a Fisher-Tropsch synthesis method with a molecular oxygen-containing gas in the presence of boric acid and boric anhydride;

wax synthesized by a metallocene catalyst such as polyethylene, polypropylene, polybutene, polypentene, polyhexene, polyheptene, polyoctene, ethylene-propylene copolymer, ethylene-butene copolymer and butene-propylene copolymer; and ester group-containing wax obtained by the reaction of a halide of long-chain alkylcarboxylic acid with polyhydric alcohol or condensation with long-chain alkyl carboxylic acid with polyhydric alcohol.

These releasing agents may be used singly or in combination of two or more kinds. When two or more kinds are used in combination, at least one kind of the releasing agents may have a melting point at a temperature of equal to or more than −50 degrees centigrade and equal to or less than 0 degree centigrade, based on the melting point of the saturated crystalline polyester (S).

These releasing agents may be used singly or in combination of two or more kinds. When two or more kinds are used in combination, at least one kind of the releasing agents may have a melting point at a temperature of equal to or more than −50 degrees centigrade and equal to or less than 0 degree centigrade, based on the melting point of the saturated crystalline polyester (S).

In the present invention, there is needed at least one kind of the releasing agents having a melting point at equal to or less than the melting point of the saturated crystalline polyester (S), preferably equal to or more than −50 degrees centigrade and equal to or less than 0 degree centigrade, and further preferably equal to or more than −45 degrees centigrade and equal to or less than 0 degree centigrade, based on the melting point of the saturated crystalline polyester (S). When the melting point of the releasing agent is in the above range, a toner excellent in fixing properties, smear resistance and offset resistance can be obtained.

The saturated crystalline polyester (S) according to the present invention is composed of an alcohol component selected from aliphatic diols having 2 to 4 carbon atoms and a carboxylic acid component selected from aliphatic dicarboxylic acids having 4 to 6 carbon atoms as main components, and rarely contains long-chain alkyl units, so that the saturated crystalline polyester (S) itself does not have mold releasability. Accordingly, when the melting points of all releasing agents to be contained are higher than the melting point of the saturated crystalline polyester (S), and the toner is fixed on paper, the saturated crystalline polyester (S) is rather melted earlier than the releasing agent and attached to a fixing roller, thus causing offset in some cases. So, the melting point of the releasing agent is preferably in the above range.

In order to improve the dispersion state in the toner, these releasing agents are preferably added in the step of producing of the high molecular weight vinyl resin (H), the low molecular weight vinyl resin (L), the carboxyl group-containing vinyl resin (C), the glycidyl group-containing vinyl resin (E) and the saturated crystalline polyester (S), or the step of reacting the carboxyl group-containing vinyl resin (C) with the glycidyl group-containing vinyl resin (E) to be described below, or are separately added in respective steps. Further preferably, the devolatilization method that the releasing agent is added in the presence of a solvent and a block copolymer consisting of a block consisting of a sequence of the ethylenically hydrocarbon-derived constituent units and/or the conjugated diene hydrocarbon-derived constituent units and a block consisting of a sequence of the styrene-derived constituent units, and/or the hydrogenated block copolymer, i.e., the hydrogenated product of the block copolymer, in the step of producing the carboxyl group-containing vinyl resin (C).

However, the method is not restricted to any of these addition methods. The releasing agent may be added according to the aforementioned method or a combination thereof, and further as necessary, it may also be added at the time of producing a toner.

In the present invention, the amount of the releasing agent added is preferably equal to or more than 1 mass % and equal to or less than 10 mass %, and further preferably equal to or more than 2 mass % and equal to or less than 8 mass %, based on the total weight of 100 mass % of the carboxyl group-containing vinyl resin (C), the glycidyl group-containing vinyl resin (E), a reaction product of the vinyl resins and the saturated crystalline polyester (S). It is preferable from the viewpoint of a balance between offset resistance and storage stability. When the amount of the releasing agent added is smaller than 1 mass %, there is no effect on the inhibition of offset of the saturated crystalline polyester (S). When it exceeds 10 mass %, deterioration of storage stability or deterioration of resistance to contamination of a photo-sensitive material and further deterioration of durability of the tonner may be caused in some cases. It is considered that deterioration of storage stability is caused by the fact that the binder resin is easily plasticized by the releasing agent and the external additive is buried on the toner surface, while deterioration of resistance to contamination of a photo-sensitive material is caused by the fact that the toner is melted by frictional heat between a photo-sensitive material and a cleaning blade. Further, dispersibility of the releasing agent is deteriorated and dropped from the toner, thus lowering durability of the toner.

Binder Resin

The binder resin of the present invention contains the carboxyl group-containing vinyl resin (C), the glycidyl group-containing vinyl resin (E), a reaction product of the vinyl resins, and the saturated crystalline polyester (S) and further contains a releasing agent having a melting point lower than that of the saturated crystalline polyester (S). By such a configuration, there can be obtained a toner excellent in a balance among low temperature fixing properties, offset resistance, smear resistance, storage stability, durability and resistance to contamination of a photo-sensitive material.

It is preferable that the binder resin of the present invention has one peak of the loss modulus (G") at equal to or more than 70 degrees centigrade and equal to or less than 85 degrees centigrade, and further preferably equal to or more than 70 degrees centigrade and equal to or less than 82 degrees centigrade at a measurement frequency of 6.28 rad/sec and the measurement range of 50 to 200 degrees centigrade. By adjusting peak of the loss modulus (G") in the above range, there can be obtained a toner excellent in a balance among low temperature fixing properties, smear resistance and storage stability.

The peak of the loss modulus (G") refers to a peak in the highest temperature among the maximum values observed in the temperature range of 50 to 200 degrees centigrade, a resin begins to be melted at a temperature higher than this peak temperature. Accordingly, this peak temperature measures heat resistance of the binder resin or the toner.

When the peak temperature is lower than 70 degrees centigrade, the toner begins to be fixed on paper at a lower temperature so that low temperature fixing properties and smear resistance are improved, but deterioration of storage stability or deterioration of resistance to contamination of a photo-sensitive material may be caused in some cases. It is considered that deterioration of storage stability is caused by the fact that the toner begins to be softened from a lower temperature and the external additive is buried on the surface of the toner, while deterioration of resistance to contamination of a photo-sensitive material is caused by the fact that the toner is melted by frictional heat between a photoreceptor and a cleaning blade. In particular, when the binder resin contains a large proportion of crystalline component, since the crystalline component causes plasticization of the binder resin or an amorphous portion causes softening of the binder resin, heat resistance tends to be impaired. So, it is important to control heat resistance by controlling the peak temperature of toner G" by reducing the amorphous portion of the crystalline component and preventing plasticization as in the present invention, in order to obtain a toner excellent in a balance among low temperature fixing properties, smear resistance and storage stability. On the other hand, when the peak temperature is higher than 85 degrees centigrade, storage stability and resistance to contamination of a photo-sensitive material are improved, whereas the toner is hardly melted even at a high temperature, and low temperature fixing properties and smear resistance are impaired in some cases.

For the binder resin of the present invention, the loss modulus (G") value at 120 degrees centigrade is preferably equal to or more than $0.3 \times 10^4$ Pa and equal to or less than $2.7 \times 10^4$ Pa, and further preferably equal to or more than $0.3 \times 10^4$ Pa and equal to or less than $2.5 \times 10^4$ Pa. By adjusting the loss modulus (G") value at 120 degrees centigrade within the above range, the saturated crystalline polyester (S) is fully melted when the toner is fixed and the viscosity of the binder resin is lowered, whereby a toner excellent in low temperature fixing properties and smear resistance can be obtained. In consideration of the upper limit of the melting point of the saturated crystalline polyester of 120 degrees centigrade, the loss modulus (G") at 120 degrees centigrade may be controlled as described above.

For the binder resin of the present invention, the minimum value of the storage modulus (G') at 50 to 200 degrees centigrade is preferably equal to or more than $1.0 \times 10^2$ Pa and equal to or less than $1.5 \times 10^4$ Pa, and further preferably equal to or more than $5.0 \times 10^2$ Pa and equal to or less than $1.2 \times 10^4$ Pa. It is preferable from the viewpoint of a balance among fixing properties, smear resistance and offset resistance. When it is lower than the lower limit, offset resistance is insufficient in some cases. When it exceeds the upper limit, fixing properties and smear resistance performance is worsened in some cases.

In order to have the peak of the loss modulus (G") and the loss modulus (G") value at 120 degrees centigrade in the above range, for example, by the use of a product obtained by subjecting the alcohol component selected from aliphatic diols having 2 to 4 carbon atoms and the carboxylic acid component selected from aliphatic dicarboxylic acids having 4 to 6 carbon atoms to polycondensation as the saturated crystalline polyester (S), the structure and the melting point of the saturated crystalline polyester (S) may be controlled. When the metal component (M) is contained in such a saturated crystalline polyester (S), as described above, a crosslinking reaction is accelerated, and the minimum value of the storage modulus (G') at 50 to 200 degrees centigrade may be in the above range.

For the binder resin of the present invention, the acid value is preferably equal to or more than 4.5 mgKOH/g and equal to or less than 30 mgKOH/g, and further preferably equal to or more than 5.0 mgKOH/g and equal to or less than 20 mgKOH/g from the viewpoint of durability. Within the above range, the resin strength is increased based on the hydrogen bond and at the same time the compatibility with other toner raw materials is increased, so that durability of the toner is improved.

For the binder resin of the present invention, the THF soluble content has a peak in the molecular weight region of equal to or more than 3,000 and less than 25,000 and preferably equal to or more than 4,000 and less than 22,000 in the chromatogram obtained by GPC. Here, the peak refers to the highest peak in the chromatogram obtained by GPC. When the peak is in this region, fixing properties, durability and storage stability of the toner become excellent. When the molecular weight of the peak is less than 3,000, the resin strength is lowered, or an oligomer component is easily increased and as a result, storage stability and durability of the toner are easily adversely affected in some cases. When the molecular weight is equal to or more than 25,000, the loss modulus (G") value at 120 degrees centigrade becomes too high, the resin is hardly melted and flowed even at a high temperature, and fixing properties are worsened in some cases.

For the binder resin of the present invention, the THF insoluble content is preferably equal to or more than 3 mass % and less than 30 mass %, and further preferably equal to or more than 4 mass % and less than 25 mass % from the viewpoint of offset resistance. When the THF insoluble content is lower than 3 mass %, the minimum value of the aforementioned storage modulus (G') at 50 to 200 degrees centigrade is extremely lowered, so that offset resistance is impaired in some cases. When it becomes high, that is, equal to or more than 30 mass %, the minimum value of the storage modulus (G') at 50 to 200 degrees centigrade is extremely high, and fixing properties and smear resistance are lowered in some cases, or the THF insoluble content and the THF soluble content are further phase-separated, and the THF insoluble content does not have an effect on offset resistance in some cases.

When the binder resin of the present invention contains the carboxyl group-containing vinyl resin (C) and the glycidyl group-containing vinyl resin (E), and further contains a crosslinking component produced by the reaction of a carboxyl group derived from the carboxyl group-containing vinyl resin (C) with a glycidyl group derived from the glycidyl group-containing vinyl resin (E).

The ratio of the carboxyl group-containing vinyl resin (C) to the glycidyl group-containing vinyl resin (E) (C/E) is preferably from 87/13 to 99/1 and more preferably from 89/11 to 97/3 in terms of the mass ratio from the viewpoint of offset resistance.

When the ratio of the glycidyl group-containing vinyl resin (E) exceeds 13 mass % based on the total weight of 100 mass % of the carboxyl group-containing vinyl resin (C) and the glycidyl group-containing vinyl resin (E), offset resistance is reduced in some cases. It is considered that this is caused by the fact that, in the reaction of the carboxyl group with the glycidyl group, the molecular weight among the crosslinked points of a crosslinked body becomes small, and the crosslinking component is excessively shrunk as the reaction proceeds; therefore, the crosslinking component is excessively phase-separated from the non-crosslinking component without letting the low molecular weight component get into a network structure of the crosslinked body; and finally, there is no effect of the crosslinking component on offset resistance. On the other hand, when the ratio of the aforementioned glycidyl group-containing vinyl resin (E) is smaller than 1 mass %, the crosslinking component is not sufficiently generated due to the reaction of the carboxyl group-containing vinyl resin with the glycidyl group-containing vinyl resin, and offset resistance is worsened in some cases.

As a method for reacting the carboxyl group-containing vinyl resin (C) with the glycidyl group-containing vinyl resin (E), preferably used is a method involving mixing the carboxyl group-containing vinyl resin (C) and the glycidyl group-containing vinyl resin (E) in the melt state in the presence of the saturated crystalline polyester (S) for the reaction, from the viewpoints of offset resistance and durability. As such a method, there may be used any conventionally known methods, for example, a method involving introducing both resins into a reaction container equipped with a stirrer or the like and heating the resulting material for the reaction in the melt state, or a method involving reacting both resins in the presence of a solvent and removing the solvent. Particularly preferably used is a method employing a twin screw kneader. Concrete examples thereof include a method involving mixing powders of the carboxyl group-containing vinyl resin (C), the glycidyl group-containing vinyl rosin (E) and the saturated crystalline polyester (S) with the use of a Henschel mixer or the like, and then conducting melt-kneading and reaction using a twin screw kneader, and a method involving feeding the carboxyl group-containing vinyl resin (C), the glycidyl group-containing vinyl resin (E) and the saturated crystalline polyester (S) in the melt state to a twin screw kneader for conducting melt-kneading and reaction.

The temperature for conducting melt-kneading and reaction is different depending on the content of functional groups and the molecular weight of the carboxyl group-containing vinyl resin (C) and the glycidyl group-containing vinyl resin (E), but it is preferably in the range of 100 to 220 degrees centigrade, more preferably in the range of 120 to 200 degrees centigrade and further preferably in the range of 130 to 180 degrees centigrade. When the reaction temperature is lower than 100 degrees centigrade, even though the formation of a crosslinked body occurs, the kneading shear is extremely strong and the formed crosslinked body is cut, so that offset resistance is worsened in some cases. When it exceeds 220 degrees centigrade, a crosslinking reaction excessively proceeds and the crosslinking component is phase-separated from the non-crosslinking component, so that there is no effect on offset resistance in some cases, or depolymerization occurs and the volatile component remained in the binder resin is increased, so that there are problems in the feature of maintaining development quality of the toner, odor and the like in some cases.

As a method for melt-kneading and reacting using a twin screw kneader, water is injected into the twin screw kneader in an amount of preferably equal to or more than 0.5 mass parts and equal to or less than 2.5 mass parts, and more preferably equal to or more than 1.0 mass part and equal to or less than 2.0 mass parts, based on 100 mass parts of the resin at a pressure of preferably equal to or more than 1 MPa and equal to or less than 3 MPa and more preferably equal to or more than 1.7 MPa and equal to or less than 2.3 MPa. Then, water and the volatile component are preferably removed by reducing the pressure preferably at 0.001 to 0.200 MPa and more preferably at 0.050 to 0.150 MPa from a pressure reducing port placed at an outlet side from a water inlet. Incidentally, in the present invention, the pressure refers to a gauge pressure, that is, a value subtracting an atmospheric pressure from an absolute pressure based on a vacuum otherwise particularly specified. By having the injection pressure within the above range, water is fully mixed in the resin so that the volatile component such as a monomer or a solvent remained in the resin is easily removed when reducing the pressure. Furthermore, when the amount of water injected is excessively small, the volatile component may not be fully removed in some cases. On the other hand, when the amount of water injected is excessively high, the state of water dispersed in the resin is deteriorated and as a result, the volatile component is hardly removed in some cases. Furthermore, by having the decompression pressure within the above range, the volatile component may be fully removed from the resin. Besides, with the use of such a method, the volatile content remained in the binder resin may be equal to or less than 200 ppm and the oligomer component having a molecular weight of equal to or less than 1,000 may be reduced at the same time; therefore, such a method is preferable.

The thus-obtained resin is cooled and ground to give a binder resin for a toner. As a method for cooling and grinding, any conventionally known methods may be adopted, and as a method for cooling, a steel belt cooler or the like can also be used for rapid cooling.

Charge Controlling Agent

It is preferable that the toner of the present invention contains a charge controlling agent in order to keep a positive electrostatic-charging property or a negative electrostatic-charging property. As a charge controlling agent, conventionally known charge controlling agents may be used.

Examples of the positive charge controlling agent include nigrosins and modified products of nigrosin with aliphatic metal salts and the like; quaternary ammonium salts such as tributylbenzylammonium-1-hydroxy-4-naphtosulfonate salt and tetrabutylammonium tetrafluoro borate, and onium salts such as their phosphonium salts that are analogs of those compounds and the lake pigments thereof; triphenylmethane dyes and lake pigments thereof (laking agents: phosphorus tungstic acid, phosphorus molybdic acid, phosphorus tungsten molybdic acid, tannic acid, lauric acid, gallic acid, ferricyanide, ferrocyanide and the like); metal salts of higher fatty acids; diorganotin oxides such as dibutyltin oxide, dioctyltin oxide and dicyclohexyltin oxide; diorganotin borates such as dibutyltin borate, dioctyltin borate and dicyclohexyltin borate; guanidine compounds, imidazole compounds, and imidazolium salts. Further examples include quaternary ammonium salt group-containing copolymers obtained by a means of quaternization or the like with para-toluenesulfonic acid alkyl ester after copolymerizing dialkylaminoalkyl (meth)acrylate and a styrene based monomer and as necessary an acrylic based monomer.

As the negative charge controlling agent, an organic metal complex and a chelate compound are effective, and examples thereof include a mono-azo metal complex, an acetylacetone metal complex, an aromatic hydroxycarboxylic acid metal complex, an aromatic dicarboxylic acid metal complex; aromatic hydroxycarboxylic acid, aromatic monocarboxylic acid or aromatic polycarboxylic acid and metal salts, anhydride, esters thereof, and bisphenol derivative such as bisphenol. Further examples include azo type metal compounds having a coordination center metal selected from Sc, Ti, V, Cr, Co, Ni, Mn and Fe, and cation selected from hydrogen ion, sodium ion, potassium ion and ammonium ion; metal compounds of aromatic hydroxycarboxylic acid derivative and aromatic polycarboxylic acid derivatives having a coordination center metal selected from Cr, Co, Ni, Mn, Fe, Ti, Zr, Zn, Si, B and Al, and cation selected from hydrogen ion, sodium ion, potassium ion, ammonium ion and aliphatic ammonium; (aromatic hydroxycarboxylic acid derivative and aromatic polycarboxylic acid may have an alkyl group, an aryl group, a cycloalkyl group, an alkenyl group, an alkoxy group, an aryloxy group, a hydroxyl group, an alkoxycarbonyl group, an aryloxycarbonyl group, an acyl group, an acyloxy group, a carboxyl group, halogen, a nitro group, a cyano group, an amide group, an amino group or a carbamoyl group as a substituent); and a polymer having a sulfonic acid group-containing monomer such as a copolymer of a sulfonic acid group-containing acrylamide based monomer, a styrene based monomer and an acrylic based monomer as a constituent component. These charge controlling agents may be used singly or in combination of two or more kinds.

The amount of the charge controlling agent added is preferably from 0.05 to 10 mass %, more preferably from 0.1 to 5 mass % and further preferably from 0.2 to 3 mass %, based on 100 mass % of the binder resin, from the viewpoint of a balance between the charge amount and fluidity of the toner. Further, as a method of adding the charge controlling agent, a method of adding it into the inside of the toner, a method of externally adding, or a combination thereof may be applied.

Coloring Agent

The color toner of the present invention contains a coloring agent. As a coloring agent, conventionally known pigments and dyes may be used.

Examples of the pigment include mineral fast yellow, navel yellow, Naphthol Yellow S, Hanza Yellow G, Permanent Yellow NCG, Tartrazine Lake, molybdenum orange, Permanent Orange GTR, Pyrazolone Orange, Benzidine Orange G, Permanent Red 4R, Watchung Red calcium salt, eosine lake, Brilliant Carmine 3B, manganese violet, Fast Violet B, Methyl Violet Lake, cobalt blue, Alkali Blue Lake, Victoria Blue Lake, Phthalocyanine Blue, Fast Sky Blue, Indanthrene Blue BC, chrome green, Pigment Green B, Malachite Green Lake, Final Yellow Green G and the like. Examples of the magenta coloring pigment include C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48, 49, 50, 51, 52, 53, 54, 55, 57, 58, 60, 63, 64, 68, 81, 83, 87, 88, 89, 90, 112, 114, 122, 123, 163, 202, 206, 207, 209, 238; C.I. Pigment Violet 19; C.I. Violet 1, 2, 10, 13, 15, 23, 29, 35 and the like. Examples of the cyan coloring pigment include C.I. Pigment Blue 2, 3, 15, 15:1, 15:2, 15:3, 16, 17; C.I. Acid Blue 6; C.I. Acid Blue 45; copper phthalocyanine pigments whose phthalocyanine skeleton has been substituted with 1 to 5 phthalimidomethyl group(s) and the like. Examples of the yellow coloring pigment include C.I. Pigment Yellow 1, 2, 3, 4, 5, 6, 7, 10, 11, 12, 13, 14, 15, 16, 17, 23, 65, 73, 74, 83, 93, 97, 155, 180, 185; C.I. Vat Yellow 1, 3, 20 and the like. Examples of the black pigment include carbon black such as furnace black, channel black, acetylene black, thermal black, lamp black. Examples of the dye include C.I. Direct Red 1; C.I. Direct Red 4; C.I. Acid Red 1; C.I. Basic Red 1; C.I. Mordant Red 30; C.I. Direct Blue 1; C.I. Direct Blue 2; C.I. Acid Blue 9; C.I. Acid Blue 15; C.I. Basic Blue 3; C.I. Basic Blue 5; C.I. Mordant Blue 7; C.I. Direct Green 6; C.I. Basic Green 4; C.I. Basic Green 6; Solvent Yellow 162 and the like. These coloring agents may be used singly or in combination of two or more kinds.

The amount of the coloring agent added to the toner is preferably from 0.05 to 20 mass %, more preferably from 0.1 to 15 mass % and further preferably from 0.2 to 10 mass %, based on 100 mass % of the binder resin.

Meanwhile, a magnetic material may also be used instead of these coloring agents. Examples of the magnetic material include metal oxides containing elements such as iron, cobalt, nickel, copper, magnesium, manganese, aluminum, silicon and the like. Concrete examples include triiron tetroxide, iron sesquioxide, zinc iron oxide, yttrium iron oxide, cadmium iron oxide, gadolinium iron oxide, copper iron oxide, lead iron oxide, nickel iron oxide, neodymium iron oxide, barium iron oxide, magnesium iron oxide, manganese iron oxide, lanthanum iron oxide, iron powder, cobalt powder, nickel powder and the like. These magnetic materials may be used in combination of two or more kinds as necessary. Furthermore, as its shape, a magnetic material in spherical shape, octahedron or hexahedron is preferably used. Further, a spherical magnetic material is preferably used from the fact that magnetic powder is uniformly dispersed in the toner.

A BET specific surface area of the magnetic powder according to a nitrogen adsorption method is preferably from 1 to 30 m$^2$/g and further preferably from 2 to 20 m$^2$/g. Further, it is preferable to use magnetic powder having a Mohs hardness of 4 to 8. The average particle diameter of the magnetic material is preferably from 0.01 to 0.8 µm and further preferably from 0.05 to 0.5 µm. Further, as magnetic properties of the magnetic material, it is preferable that the coercivity is from 1 to 20 kA/m by applying 795.8 kA/m, the saturation magnetization is from 50 to 200 Am$^2$/kg, and the residual magnetization is from 1 to 20 Am$^2$/kg. The amount of the magnetic material added is preferably from 4 to 200 mass %, more preferably from 10 to 170 mass % and further preferably from 20 to 150 mass %, based on 100 mass % of the binder resin.

Meanwhile, the toner of the present invention may be used by partially adding as necessary, for example, polyvinyl chloride, polyvinyl acetate, polyester, polyvinyl butyral, polyurethane, polyamide, polystyrene, rosin, polymerized rosin, modified rosin, terpene resin, phenolic resin, aromatic petroleum resin, vinyl chloride resin, styrene-butadiene resin, styrene-(meth)acrylic copolymer, chromane-indene resin, melamine resin or the like, in the ranges in which the effect of the present invention is not hindered.

For the purpose of improving pigment dispersion, a coloring agent may be dispersed in the binder resin or the raw material resin in advance to prepare a so-called masterbatch, and the masterbatch may be added to the toner. Specifically, a coloring agent of 20 to 60 mass % and a resin component of 80 to 40 mass % are mixed in the powder state, and the resulting mixture is kneaded with a twin screw kneader, an open roll kneader, or a batch kneader such as a pressure kneader, and the kneaded mixture followed by grinding may be used during production of a toner.

Surface Treatment Agent

For the toner of the present invention, a surface treatment agent is preferably present between the toner and a carrier, or between toners by adding a surface treatment agent to the surface of the toner. By adding the surface treatment agent, the powder fluidity, storage stability, electrification stability and environmental stability may be improved, and life of a developing agent may also be improved.

As the surface treatment agent, conventionally known surface treatment agents may be used, and examples thereof include fine silica powder, fine titanium oxide powder and a hydrophobically modified product thereof. As fine silica powder, there can be used wet silica, dry silica, and a complex of dry silica and metal oxide; and fine silica powder subjected to hydrophobizing treatment with an organic silicon compound or the like may be further used. As the hydrophobizing treatment, for example, a method of treating fine silica powder generated by vapor-phase oxidation of a silicon halogenated compound with a silane compound and with an organic silicon compound can be cited. Examples of the silane compound used for the hydrophobizing treatment include, for example, hexamethyl disilazane, trimethyl silane, trimethyl chlorosilane, trimethyl ethoxysilane, dimethyl dichlorosilane, methyl trichlorosilane, allyldimethyl chlorosilane, allylphenyl dichlorosilane, benzyldimethyl chlorosilane, bromomethyl dimethylchlorosilane, α-chloroethyl trichlorosilane, β-chloroethyl trichlorosilane, chloromethyl dimethylchlorosilane, triorganosilyl mercaptan, trimethylsilyl mercaptan, triorganosilyl acrylate, vinyldimethyl acetoxysilane, dimethyldiethoxy silane, dimethyldimethoxy silane, diphenyldiethoxy silane, hexamethyl disiloxane, 1,3-divinyl tetramethyl disiloxane, 1,3-diphenyl tetramethyl disiloxane and the like. Examples of the organic silicon compound used for the hydrophobizing treatment include, for example, silicone oils such as dimethyl silicone oil, methylphenyl silicone oil, α-methyl styrene-modified silicone oil, chlorophenyl silicone oil, fluorine-modified silicone oil and the like. Further, fine titanium oxide powder subjected to oil treatment and fine particle of a vinyl resin of from 0.03 to 1 µm may also be used.

As the surface treatment agent in addition thereto, there may also be used a lubricant such as polyethylene fluoride, zinc stearate and polyvinylidene fluoride; an abrasive such as cerium oxide, silicon carbide, strontium titanate, magnetic powder, alumina and the like; and a conductive grant agent such as carbon black, zinc oxide, antimony oxide, tin oxide and the like. As the shape of the surface treatment agent, there may be used various shapes such as a particle having a small particle diameter of equal to or less than 100 nm, a particle having a large particle diameter of equal to or more than 100 nm, octahedron shape, hexahedron shape, needle shape, fiber shape and the like. The surface treatment agents may be used singly or in combination of two or more kinds.

The amount of the surface treatment agent added is, for example, preferably from 0.1 to 10 mass parts and further preferably from 0.1 to 5 mass parts in 100 mass parts of the toner.

Carrier

When the toner of the present invention is used as a two-component developing agent, conventionally known carriers may be used as a carrier. For example, there may be used particles having a number average particle diameter of from 15 to 300 μm composed of metals such as surface-oxidized iron or non-oxidized iron, cobalt, manganese, chromium, copper, zinc, nickel, magnesium, lithium and rare earths, and an alloy thereof or oxides. As the carriers, there may be used carriers with its surface coated by a styrene resin, an acrylic resin, a silicon resin, a polyester resin, a fluorine resin or the like. Furthermore, there may be used magnetic carriers having a magnetic microparticle dispersed core obtained by dispersing magnetic microparticles in the resin and a coated layer containing a coated resin to be applied on the surface of the magnetic microparticle dispersed core.

The resulting color toner according to the present invention may be applied to various known development processes. Examples include, for example, a cascade development method, a magnetic brush development method, a powder cloud development method, a touch-down development method, a so-called micro-toning development method using, as a carrier, a magnetic toner produced by grinding, and a so-called bipolar magnetic toner development method in which a required amount of toner charges is obtained by the friction between magnetic toners. The development methods are not restricted thereto. The resulting color toner according to the present invention may also be applied to various cleaning methods such as a conventionally known fur brush method, a blade method and the like. Further, the resulting color toner according to the present invention may be applied to various conventionally known fixing methods. Concrete examples thereof include an oil-free heat roll fixing method, an oil-coated heat roll fixing method, a thermal belt fixing method, a flash fixing method, an oven fixing method, a pressure fixing method and the like. The toner may also be applied to a fixing apparatus using an electromagnetic induction heating method. Further, it may also be applied to an image forming method involving an intermediate transfer step.

Method for Producing Toner

The toner of the present invention is produced according to a conventionally known method. For example, the following method can be cited. Firstly, the binder resin and a coloring agent, and as necessary other additives such as a releasing agent, a charge controlling agent, are sufficiently mixed using a powder mixer such as a Henschel mixer, and then the resulting mixture is melt-kneaded using a kneading machine such as a twin screw kneader, an open roll kneader or the like for sufficiently mixing individual constituent components. The melt-kneaded material is cooled, ground and sieved to collect particles having a particle diameter of ordinarily 4 to 15 μm. A surface treatment agent is used to the collected particles according to the powder mixing method, to obtain a toner. As necessary, the toner may be subjected to spheroidizing treatment using a surface treatment device or the like. As a surface treatment method, there can be mentioned, for example, a method of subjecting the toner to spheroidizing by inflowing it in a hot air jet and a method of taking an angle of the toner by mechanical impact. For the purpose of improvement of image quality or the like, an average circularity measured using a flow particle image analyzer (for example, FIPA-3000, a product of Sysmex Corporation) may be adjusted to equal to or more than 0.960 by carrying out such a surface treatment.

Toner

The toner of the present invention contains at least the carboxyl group-containing vinyl resin (C), the glycidyl group-containing vinyl resin (E), a reaction product of the vinyl resins and the saturated crystalline polyester (S).

A toner excellent in fixing properties and offset resistance can be obtained by forming the carboxyl group-containing vinyl resin (C), the glycidyl group-containing vinyl resin (E), and the crosslinking component generated by reacting both vinyl resins. Furthermore, the viscosity of the toner is lowered in the vicinity of the melting point of the crystalline polyester because of the saturated crystalline polyester (S) contained in the toner, so that fixing properties may be further improved; and the crystalline polyester is present on the surface of the fixed toner, whereby frictional resistance on the fixed toner surface is reduced and a toner excellent in smear resistance can be obtained.

The saturated crystalline polyester (S) used for the present invention has a melting point at equal to or more than 75 degrees centigrade and equal to or less than 120 degrees centigrade, and preferably equal to or more than 80 degrees centigrade and equal to or less than 115 degrees centigrade, and contains the metal component (M) selected from Zn, Ca, Mg, Al and Ba. The metal component (M) (excluding metal oxide of the magnetic material) is derived from a fatty acid metal salt represented by the general formula 1. The metal component (M) is contained in an amount of equal to or more than 0.10 mass % and equal to or less than 5.0 mass %, preferably equal to or more than 0.10 mass % and equal to or less than 2.0 mass %, and more preferably equal to or more than 0.15 mass % and equal to or less than 0.95 mass %, based on 100 mass % of the saturated crystalline polyester (S). Furthermore, the metal component (M) is contained in an amount of preferably equal to or more than 0.011 mass % and equal to or less than 1 mass %, more preferably equal to or more than 0.011 mass % and equal to or less than 0.15 mass %, and further preferably equal to or more than 0.011 mass % and equal to or less than 0.12 mass %, based on the total weight of 100 mass % of the carboxyl group-containing vinyl resin (C), the glycidyl group-containing vinyl resin (E), a reaction product of the vinyl resins and the saturated crystalline polyester (S).

(i) a balance among fixing properties, smear resistance and storage stability is improved by adjusting the melting point of the saturated crystalline polyester (S) in the above range; (ii) an amorphous portion is reduced by the fatty acid metal salt present in the saturated crystalline polyester (S) as a domain accelerate crystallization of the saturated crystalline polyester (S), and storage stability and smear resistance are improved; (iii) the fatty acid metal salt works as the catalyst of the reaction of the carboxyl group-containing vinyl resin (C) with the glycidyl group-containing vinyl resin (E), the saturated crystalline polyester (S) is finely dispersed in the carboxyl group-containing vinyl resin (C), the glycidyl group-containing vinyl resin (E) and a reaction product of the vinyl resins with efficiency, whereby dropping of the saturated polyester (S) from the toner is prevented and durability of the toner is improved and the acceleration of the formation of the crosslinking body gives toner excellent offset resistance.

The toner of the present invention contains at least one kind of releasing agents having a melting point at preferably equal to or more than −50 degrees centigrade and equal to or less than 0 degree centigrade, and more preferably equal to or more than −45 degrees centigrade and equal to or less than 0 degree centigrade, based on the melting point of the saturated crystalline polyester (S). The releasing agent is contained in an amount of preferably equal to or more than 1 mass % and equal to or less than 10 mass %, and more preferably equal to or more than 2 mass % and equal to or less than 8 mass %. At least one kind of releasing agents having a melting point within the above range is contained, whereby attachment of the saturated crystalline polyester (S) onto the fixing roller is prevented and offset resistance is improved.

The toner of the present invention has one peak of the loss modulus (G") preferably at equal to or more than 70 degrees centigrade and equal to or less than 85 degrees centigrade, and more preferably at equal to or more than 70 degrees centigrade and equal to or less than 82 degrees centigrade at a measurement frequency of 6.28 rad/sec. G" at 120 degrees centigrade is preferably equal to or more than $0.3 \times 10^4$ Pa and equal to or less than $2.7 \times 10^4$ Pa, and more preferably equal to or more than $0.3 \times 10^4$ Pa and equal to or less than $2.5 \times 10^4$ Pa. The minimum value of the storage modulus (G') at 50 to 200 degrees centigrade is preferably equal to or more than $1.0 \times 10^2$ Pa and equal to or less than $1.5 \times 10^4$ Pa, and more preferably equal to or more than $5.0 \times 10^2$ Pa and equal to or less than $1.2 \times 10^4$ Pa. The storage modulus (G') and loss modulus (G") of the toner may be controlled by adjusting the storage modulus (G') and loss modulus (G") of the toner binder resin.

When the loss modulus (G") peak and G" at 120 degrees centigrade are within the above range, heat resistance of the toner is improved to give a toner excellent in storage stability and resistance to contamination of a photo-sensitive material. Furthermore, the saturated crystalline polyester (S) is fully melted when the toner is fixed, whereby a toner excellent in fixing properties and smear resistance can be obtained by lowering the viscosity of the binder resin.

Meanwhile, when the minimum value of the storage modulus (G') at 50 to 200 degrees centigrade is within the above range, whereby a toner excellent in a balance among fixing properties, smear resistance and offset resistance can be obtained.

For the toner of the present invention, the tetrahydrofuran (THF) soluble content has a main peak in the molecular weight region of preferably equal to or more than 3,000 and less than 25,000, and more preferably equal to or more than 4,000 and less than 22,000 in the molecular weight distribution measured by gel permeation chromatography (GPC). When the main peak is in the above range, a toner excellent in fixing properties, durability and storage stability is obtained.

For the toner of the present invention, the THF insoluble content derived from the binder resin is contained in an amount of preferably equal to or more than 3 mass % and less than 30 mass %, and further preferably equal to or more than 4 mass % and less than 25 mass % from the viewpoint of offset resistance. When the THF insoluble content is adjusted to fall in the above range, offset resistance may be greatly improved without damaging fixing properties and smear resistance.

EXAMPLES

The present invention is now illustrated in detail below with reference to Examples. However, the present invention is not restricted to these Examples. Furthermore, methods of measuring and judging data are as follows. In Tables, St represents styrene, Mac represents methacrylic acid, BA represents n-butyl acrylate, and GMA represents glycidyl methacrylate.

Acid Value

The acid value (AV) in the Example was calculated in the following manner. An accurately weighed sample was dissolved in a mixed solvent of xylene and n-butanol (mass ratio=1:1). The solution was titrated with alcohol of standardized N/10 potassium hydroxide (7 g of special class potassium hydroxide was added to 5 g of ion exchange water, diluted to 1 L (liter) with first class ethyl alcohol, and then titrated with N/10 hydrochloric acid and 1% phenolphthalein solution to determine titer=F) for calculating the acid value from its neutralization amount according to the following equation.

$$\text{Acid value (mgKOH/g)} = (\text{N/10 KOH titration amount (ml)} \times F \times 5.61)/(\text{sample (g)} \times 0.01)$$

Molecular Weight

The peak molecular weight in the Example (excluding the molecular weight of the crystalline polyester) was obtained by GPC (gel permeation chromatography) method, and is a molecular weight calculated with reference to a calibration curve produced by the use of the monodispersed standard polystyrene. The measurement conditions are as follows.

GPC apparatus: SHODEX (registered trademark) GPC SYSTEM-21 (a product of Showa Denko K.K.)

Detector: SHODEX (registered trademark) RI SE-31 (a product of Showa Denko K.K.)

Column: SHODEX (registered trademark) GPC KF-G×1+GPC KF-807L×3+GPC KF-800D×1 (a product of Showa Denko K.K.) (serially connected in this order)

Solvent: tetrahydrofuran (THF)

Flow rate: 1.2 ml/min.

Sample concentration: 0.002 g-resin/ml-THF

Injected amount: 100 μL

The component insoluble in THF was removed from the sample solution by means of a filter right before the measurement. To measure the molecular weight of a toner, 10 mass parts of the toner was fully dissolved in 90 mass parts of THF, and then 50 mass parts of SIMGON talc and 50 mass parts of titanium oxide (CR-95) were added thereto and carried out centrifugation. The resulting supernatant liquid was adjusted to a prescribed concentration for measuring the molecular weight.

The molecular weight of crystalline polyester was also obtained by GPC (gel permeation chromatography) method, and is a molecular weight calculated with reference to a calibration curve produced by the use of the monodispersed standard polystyrene. The measurement conditions are as follows.

GPC apparatus: GPC manufactured by Waters Corporation

Detector: 2414 manufactured by Waters Corporation

Column: SI-IODEX (registered trademark) LF-G×1+LF-804×1 (a product of Showa Denko K.K.) (serially connected in this order)

Solvent: chloroform

Flow rate: 1.0 ml/min.

Sample concentration: 0.001 g-resin/ml-chloroform

Injected amount: 100 μL

The component insoluble in chloroform was removed from the sample solution by means of a filter right before the measurement. In the present invention, the molecular weight of the main peak was determined by the above method as a molecular weight.

Glass Transition Temperature (Tg) and Melting Point

Tg in the Example was measured using DSC-20 (a product of Seiko Instruments Inc.) according to differential scanning calorimetry (DSC). About 10 mg of a sample was subjected to temperature elevation from −20 to 200 degrees centigrade at a rate of 10 degrees centigrade/min to obtain a curve; in the curve, an intersection between the base line and the inclined line of the endothermic peak was determined; and the Tg of the sample was determined from the intersection. Also, the melting points of the releasing agent and polyester were determined from the endothermic peak using the above apparatus.

Epoxy Value

The epoxy value was calculated in the following procedure. 0.2 g to 5 g of a resin sample was weighed accurately and put into a 200-ml Erlenmeyer flask, and then 25 ml of dioxane was added thereto and dissolved therein. 25 ml of a ⅕ normal hydrochloric acid solution (dioxane solvent) was added, and the resulting solution was sealed and fully mixed, and then allowed to stand for 30 minutes. Next, 50 ml of a mixed solution of toluene and ethanol (volume ratio=1:1) was added, and then the reaction solution was titrated with a ¹⁄₁₀ normal aqueous sodium hydroxide solution using cresol red as an indicator. Based on the titration results, the epoxy value (Eq/100 g) was calculated according to the following equation.

$$\text{Epoxy value (Eq/100 g)} = [(B-S) \times N \times F]/(10 \times W)$$

Herein, W refers to the amount of collected sample (g), B refers to the amount of the aqueous sodium hydroxide solution (ml) required for a blank test, S refers to the amount of the aqueous sodium hydroxide solution (ml) required for the test of the sample, N refers to the normality of the aqueous sodium hydroxide solution, and F refers to the titer of the aqueous sodium hydroxide solution.

Measurement of Viscoelasticity

The viscoelasticity in the present invention was determined according to the following measurement.

Viscoelasticity apparatus: STRESS TECH Rheometer (a product of ReoLogica Instruments AB)
Measurement mode: Oscillation strain control
Measurement temperature range: 50 to 200 degrees centigrade
Temperature elevation rate: 2 degrees centigrade/min.
Frequency: 1 Hz (6.28 rad/s)
Gap: 1 mm
Plate: Parallel plates
Stress strain: 1%
Sample shape: Cylindrical shape having a thickness of 1 mm and a diameter of about 20 mm THF Insoluble Content The THF insoluble content of the binder resin in the present invention was obtained in the following manner.

0.4 g of a resin and 39.5 g of THF were fed into a 50-ml lidded glass sample tube, and this sample tube was stirred under conditions of a rotation speed of 50 rpm and a temperature of 22 degrees centigrade for 48 hours, and then allowed to stand at 22 degrees centigrade for 48 hours. Thereafter, 5 g of the supernatant liquid in the sample tube was dried at 150 degrees centigrade for 1 hour and then its weight was measured, and this weight was taken as X g to calculate the THF insoluble content (mass %) according to the following equation.

$$\text{THF insoluble content (mass \%)} = \frac{(0.4/(0.4+39.5)) - X/5}{0.4/(0.4+39.5)} \times 100 \quad \text{[Equation 1]}$$

For the THF insoluble content of the toner according to the present invention, the amount of THF soluble content of the toner was measured in the same manner as in the THF insoluble content of the binder resin and its weight was taken as X g. The amount of the component other than the resin in the toner was taken as Y g and the THF insoluble content (mass %) was calculated according to the following equation.

$$\text{THF insoluble content (mass \%)} = \frac{1.0 - (X+Y)}{1.0 - Y} \times 100 \quad \text{[Equation 2]}$$

1. Evaluation of Fixing Properties

An unfixed image was formed using a copier produced by remodeling a commercial electrophotographic copier. The unfixed image was fixed using a heat roller fixing apparatus produced by remodeling the fixing section of a commercial copier at a fixing speed of the heat roller of 190 mm/sec at a temperature of 130 and 150 degrees centigrade. The fixed image obtained was rubbed 6 times by applying a load of 1.0 kgf using a sand eraser (a product of Tombow Pencil Co., Ltd.), and the image densities before and after the rubbing test were measured using a Macbeth reflection densitometer. The image density after the rubbing test÷image density before the rubbing test×100 was taken as the change ratio. The change ratio was measured in the same manner by changing the density of the image, and the lowest numerical value of the change ratio was taken as the lowest change ratio at respective temperatures. The average value of the lowest change ratios at 130 and 150 degrees centigrade was calculated as a fixing ratio which was then determined on the basis of the following evaluation standard. Incidentally, the heat roller fixing apparatus used herein had no silicon oil feeder. The environmental conditions were under normal temperature and normal pressure (temperature=22 degrees centigrade, relative humidity=-55%).

(Evaluation Standard)
A: 65%≤Fixing ratio
B: 60%<Fixing ratio<65%
C: Fixing ratio≤60%

2. Offset Resistance

The offset resistance was evaluated as follows according to the above measurement of the fixing evaluation. After an unfixed image was formed using the above copier, the toner image was fixed using the above heat roller fixing apparatus. Then, the appearance of toner staining on the non-image portion was examined visually. This operation was repeated by gradually increasing the set temperature of the heat roller of the heat roller fixing apparatus from 100 to 250 degrees centigrade at intervals of 5 degrees centigrade. The set temperature width at which toner staining did not appear on the transfer paper was taken as the temperature width of offset resistance. The atmosphere of the above copier was a temperature of 22 degrees centigrade and a relative humidity of 55%.

(Evaluation Standard)

A: 100 degrees centigrade≤Temperature width of offset resistance

B: 80 degrees centigrade≤Temperature width of offset resistance<100 degrees centigrade C: Temperature width of offset resistance<80 degrees centigrade 3. Smear Resistance A 0.6 mg/cm² unfixed image of 5 cm×5 cm was formed in accordance with the above measurement of the fixing evaluation and was fixed at a fixing speed of 190 mm/sec at a temperature of 150 degrees centigrade. This test piece was rubbed 10 times with commercial OA paper (My Paper, a product of NBS Ricoh Co., Ltd.) by applying a load of 200 g using a color fastness rubbing tester (sextuple) (a product of Nihon TMC Co., Ltd.), and the image density of the friction test paper was measured using a Macbeth reflection densitometer.

(Evaluation Standard)

A: Image density of friction test paper≤0.9

B: 0.9<Image density of friction test paper≤1.1

C: 1.1<Image density of friction test paper

4. Storage Stability 5 g of a toner was allowed to stand under the environmental conditions of a temperature of 50 degrees centigrade and a relative humidity of 60% for 24 hours, and the toner was fed into a sieve of 150 mesh. Then, the scale of a rheostat of a powder tester (Hosokawa Powder Technology Research Institute) was set to 3 for and vibrated it for a minute. After vibration, the mass remained on the sieve of 150 mesh was measured to determine the residual mass ratio.

(Evaluation Standard)

A: Residual mass ratio<25%

B: 25%≤Residual mass ratio<30%

C: 30%≤Residual mass ratio

5. Durability

To a 10-ml glass sample tube was fed 24 g of a stainless steel ball having a diameter of 4 mm, and 0.05 g of a toner was added thereto. The tube was lidded, and the resulting material was stirred while rotating at a rate of 300 rpm for 20 minutes. The particle size distributions of the toner before and after stirring were measured by the use of a coulter counter (number median diameter D50 before stirring−number median diameter D50 after stirring)÷number median diameter D50 before stirring×100 was taken as the particle diameter change ratio which was then determined according to the following standard.

(Evaluation Standard)

A: Particle diameter change ratio≤21%

B: 21%<Particle diameter change ratio≤23%

C: 23%<Particle diameter change ratio

6. Stain Resistance in Photo-sensitive Material

After continuous copying of 20,000 copies was conducted at a temperature of 22 degrees centigrade and a relative humidity of 55% using the above copier, contamination of a photo-sensitive material was evaluated visually.

(Evaluation Standard)

A: Not contaminated at all.

B: Slight stain confirmed.

C: Stain confirmed.

Production Examples of Glycidyl Group-containing Vinyl Resin (E)

Production Example E-1

50 mass parts of xylene was fed into a flask purged with nitrogen and the resulting material was heated. Under xylene reflux, a mixed solution obtained by previously mixing 0.5 mass parts of di-t-butylperoxide with 100 mass parts of the monomer as described in Table 1 for dissolving was continuously added over 5 hours, and further continuously refluxed for 1 hour. Thereafter, while an internal temperature was maintained at 130 degrees centigrade, 0.5 mass parts of di-t-butylperoxide was added and the reaction was continued for 2 hours to obtain a polymerization solution. The resulting polymerization solution was flashed in a vessel of 1.33 kPa at 160 degrees centigrade for removing a solvent or the like to obtain a resin E-1. The physical properties are shown in Table 1.

Production Example E-2

50 mass parts of xylene was fed into a flask purged with nitrogen and the resulting material was heated. Under xylene reflux, a mixed solution obtained by previously mixing 0.4 mass parts of di-t-butylperoxide with 100 mass parts of the monomer as described in Table 1 for dissolving was continuously added over 5 hours, and further continuously refluxed for 1 hour. Thereafter, while an internal temperature was maintained at 130 degrees centigrade, 0.5 mass parts of di-t-butylperoxide was added and the reaction was continued for 2 hours to obtain a polymerization solution. The resulting polymerization solution was flashed in a vessel of 1.33 kPa at 160 degrees centigrade for removing a solvent or the like to obtain a resin E-2. The physical properties are shown in Table 1.

Production Example E-3

A resin E-3 was obtained in the same manner as in Production Example E-1 with compositions as indicated in Table 1. The physical properties are shown in Table 1.

Production Example E-4

50 mass parts of xylene was fed into a flask purged with nitrogen and the resulting material was heated. Under xylene reflux, a mixed solution obtained by previously mixing 1.2 mass parts of di-t-butylperoxide with 100 mass parts of the monomer as described in Table 1 for dissolving was continuously added over 5 hours, and further continuously refluxed for 1 hour. Thereafter, while an internal temperature was maintained at 130 degrees centigrade, 0.5 mass parts of di-t-butylperoxide was added and the reaction was continued for 2 hours to obtain a polymerization solution. The resulting polymerization solution was flashed in a vessel of 1.33 kPa at 160 degrees centigrade for removing a solvent or the like to obtain a resin E-4. The physical properties are shown in Table 1.

Production Example E-5

A resin E-5 was obtained in the same manner as in Production Example E-1 with compositions as indicated in Table 1. The physical properties are shown in Table 1.

TABLE 1

Glycidyl Group-containing Vinyl Resin/Crosslinking Agent E

| Resin Name | Monomer Composition | | | | | Physical Properties | |
|---|---|---|---|---|---|---|---|
| | St wt% | BA wt% | Mac wt% | GMA wt% | Total wt% | Peak Mw ×10³ | Epoxy value Eq/100 g |
| E-1 | 77.0 | 20.0 | 0.0 | 3.0 | 100 | 51.0 | 0.021 |
| E-2 | 78.5 | 21.0 | 0.0 | 0.5 | 100 | 58.1 | 0.004 |
| E-3 | 70.0 | 20.0 | 0.0 | 10.0 | 100 | 46.9 | 0.070 |
| E-4 | 77.5 | 21.5 | 0.0 | 1.0 | 100 | 31.2 | 0.007 |
| E-5 | 79.0 | 21.0 | 0.0 | 0.0 | 100 | 50.3 | 0.000 |

Production Examples of Low Molecular Weight Vinyl Resin (L)

Production Example L-1

100 mass parts of xylene was fed into a flask purged with nitrogen and the resulting material was heated. Under xylene reflux, a mixed solution obtained by previously mixing 10 mass parts of t-butylperoxy-2-ethylhexanoate with 100 mass parts of the monomer as described in Table 2 for dissolving was continuously added over 5 hours, and further continuously refluxed for 1 hour. Thereafter, while an internal temperature was maintained at 98 degrees centigrade, 0.5 mass parts of L-butylperoxy-2-ethylhexanoate was added and the reaction was continued for 1 hour, and 0.5 mass parts of L-butylperoxy-2-ethylhexanoate was further added and the reaction was continued for 2 hours to obtain a polymerization solution L-1. The physical properties are shown in Table 2.

Production Example L-2

75 mass parts of xylene was fed into a flask purged with nitrogen and the resulting material was heated. Under xylene reflux, a mixed solution obtained by previously mixing 12 mass parts of t-butylperoxy-2-ethylhexanoate with 100 mass parts of the monomer as described in Table 2 for dissolving was continuously added over 5 hours, and further continuously refluxed for 1 hour. Thereafter, while an internal temperature was maintained at 98 degrees centigrade, 0.3 mass parts of t-butylperoxy-2-ethylhexanoate was added and the reaction was continued for 1 hour, and 0.5 mass parts of t-butylperoxy-2-ethylhexanoate was further added and the reaction was continued for 2 hours to obtain a polymerization solution L-2. The physical properties are shown in Table 2.

Production Example L-3

75 mass parts of xylene was fed into a flask purged with nitrogen and the resulting material was heated. Under xylene reflux, a mixed solution obtained by previously mixing 2.5 mass parts of t-butylperoxy-2-ethylhexanoate with 100 mass parts of the monomer as described in Table 2 for dissolving was continuously added over 5 hours, and further continuously refluxed for 1 hour. Thereafter, while an internal temperature was maintained at 98 degrees centigrade, 0.5 mass parts of t-butylperoxy-2-ethylhexanoate was added and the reaction was continued for 1 hour, and 0.5 mass parts of t-butylperoxy-2-ethylhexanoate was further added and the reaction was continued for 2 hours to obtain a polymerization solution L-3. The physical properties are shown in Table 2.

Production Example L-4

50 mass parts of xylene was fed into a flask purged with nitrogen and the resulting material was heated. Under xylene reflux, a mixed solution obtained by previously mixing 1.8 mass parts of t-butylperoxy-2-ethylhexanoate with 100 mass parts of the monomer as described in Table 2 for dissolving was continuously added over 5 hours, and further continuously refluxed for 1 hour. Thereafter, while an internal temperature was maintained at 98 degrees centigrade, 0.5 mass parts of t-butylperoxy-2-ethylhexanoate was added and the reaction was continued for 1 hour, and 0.5 mass parts of t-butylperoxy-2-ethylhexanoate was further added and the reaction was continued for 2 hours to obtain a polymerization solution L-4. The physical properties are shown in Table 2.

Production Examples L-5 and L-6

Polymerization solutions L-5 and L-6 were obtained in the same manner as in Production Example L-4 with feeding compositions as indicated in Table 2. The physical properties are shown in Table 2.

Production Example L-7

A polymerization solution L-7 was obtained in the same manner as in Production Example E-1 with feeding compositions as indicated in Table 2. The physical properties are shown in Table 2.

TABLE 2

Low Molecular Weight Vinyl Resin (L)

| Name of Resin | Monomer Composition | | | Physical Properties | |
|---|---|---|---|---|---|
| | St mass% | BA mass% | Mac mass% | Peak Mw ×10³ | AV KOHmg/g |
| L-1 | 93.0 | 6.0 | 1.0 | 4.6 | 6.5 |
| L-2 | 100.0 | | | 4.0 | 0.0 |
| L-3 | 79.0 | 20.0 | 1.0 | 13.5 | 6.5 |
| L-4 | 81.5 | 17.5 | 1.0 | 21.9 | 6.5 |
| L-5 | 79.0 | 18.5 | 2.5 | 13.7 | 16.3 |
| L-6 | 79.0 | 20.5 | 0.5 | 13.4 | 3.3 |
| L-7 | 78.0 | 20.5 | 1.0 | 53.0 | 6.5 |

Production Examples of High Molecular Weight Vinyl Resin (H)

Production Example H-1

100 mass parts of monomers as illustrated in Table 3 was fed into a flask purged with nitrogen. An internal temperature was elevated to 120 degrees centigrade and kept at the same temperature, and bulk polymerization was carried out for 8 hours. Subsequently, 50 mass parts of xylene was added, 0.2 mass parts of tetraethylene glycol diacrylate was added, and then the temperature was elevated to 110 degrees centigrade. 0.35 mass parts of 1,1-bis(t-butylperoxy)cyclohexane and 60 mass parts of xylene previously mixed and dissolved were continuously added over 9 hours while maintaining the temperature at 110 degrees centigrade, and then the reaction was continued for 1 hour. 0.21 mass parts of 1,1-bis(t-butylperoxy)cyclohexane was added and the reaction was continued for 2 hours. 0.52 mass parts of 1,1-bis(t-butylperoxy)cyclohexane was further added and the reaction was continued for 2 hours, whereby the polymerization was completed to obtain a polymerization solution H-1. The physical properties are shown in Table 3.

Production Example H-2

100 mass parts of monomers as illustrated in Table 3 was fed into a flask purged with nitrogen. An internal temperature was elevated to 128 degrees centigrade and kept at the same temperature, and bulk polymerization was carried out for 3 hours. Subsequently, 50 mass parts of xylene was added. Thereafter, the temperature was elevated to 110 degrees centigrade. 0.35 mass parts of 1,1-bis(t-butylperoxy)cyclohexane and 60 mass parts of xylene previously mixed and dissolved were continuously added over 9 hours while maintaining the temperature at 110 degrees centigrade, and then the reaction was continued for 1 hour. 0.21 mass parts of 1,1-bis(t-butylperoxy)cyclohexane was added and the reaction was continued for 2 hours. 0.52 mass parts of 1,1-bis(t-butylperoxy)cyclohexane was further added and the reaction was continued for 2 hours, whereby the polymerization was completed to obtain a polymerization solution H-2. The physical properties are shown in Table 3.

Production Example H-3

A polymerization solution H-3 was obtained in the same manner as in Production Example H-1 with feeding compositions as indicated in Table 3. The physical properties are shown in Table 3.

Production Example H-4

A polymerization solution H-4 was obtained in the same manner as in Production Example H-2 with feeding compositions as indicated in Table 3. The physical properties are shown in Table 3.

TABLE 3

| Name of Resin | High Molecular Weight Vinyl Resin (H) | | | | | | |
|---|---|---|---|---|---|---|---|
| | Monomer Composition | | | | Total mass % | Physical Properties | |
| | St mass % | BA mass % | Mac mass % | GMA mass % | | Peak Mw ×10³ | AV KOHmg/g |
| H-1 | 74.0 | 23.5 | 2.5 | 0.0 | 100 | 30 | 16.3 |
| H-2 | 78.0 | 19.5 | 2.5 | 0.0 | 100 | 17 | 16.3 |
| H-3 | 72.5 | 23.5 | 4.0 | 0.0 | 100 | 32 | 26.0 |
| H-4 | 75.4 | 23.6 | 1.0 | 0.0 | 100 | 16 | 6.5 |

Production Examples of Saturated Crystalline Polyester Resin (S) and Polyester for Comparison Production Example S-1

A 4-necked flask was equipped with a reflux condenser, a water-separating unit, a nitrogen gas inlet tube, a thermometer and a stirrer. Thereinto were fed alcohol components and carboxylic acid components with feeding compositions as indicated in Table 4. Thereinto was fed 0.15 mass parts of a 2-propanol solution of titanium lactate (concentration 45%) (Orgatics TC-310, a product of Matsumoto Fine Chemical Co., Ltd., based on the total weight of 100 mass parts of the alcohol components and carboxylic acid components. The reaction was carried out at 150 degrees centigrade for 2 hours while introducing nitrogen into the flask, and then the flask was heated to 220 degrees centigrade to carry out the reaction for 5 hours. Thereafter, the reaction was further carried out under a reduced pressure of equal to or less than 8.0 kPa for 2 hours to carry out dehydrative polycondensation. After the reaction, the flask was cooled to 180 degrees centigrade, and 5 mass parts of zinc stearate was added to 95 mass parts of the resin and mixed for 30 minutes. The reaction material was taken out of the flask, cooled, and ground to obtain a polyester resin S-1. The physical properties are shown in Table 4.

Production Examples S-2 to S-15, S-19, S-20

Polyester resins S-2 to S-15, S-19 and S-20 were obtained in the same manner as in Production Example S-1 with feeding compositions as indicated in Table 4. The physical properties are shown in Table 4.

Production Example S-16

A 4-necked flask was equipped with a reflux condenser, a water-separating unit, a nitrogen gas inlet tube, a thermometer and a stirrer. Thereinto were fed alcohol components and carboxylic acid components with feeding compositions as indicated in Table 4. Thereinto were fed 0.15 mass parts of a 2-propanol solution of titanium lactate (concentration 45%) (Orgatics TC-310, a product of Matsumoto Chemical Industry Co., Ltd.) and 0.2 mass parts of hydroquinone, based on the total weight of 100 mass parts of the alcohol components and carboxylic acid components. The reaction was carried out at 150 degrees centigrade for 2 hours while introducing nitrogen into the flask, and then the flask was heated to 220 degrees centigrade to carry out the reaction for 5 hours. Thereafter, the reaction was further carried out under a reduced pressure of equal to or less than 8.0 kPa for 2 hours to carry out dehydration and polycondensation. After the reaction, the flask was cooled to 180 degrees centigrade, and the fatty acid metal salt as indicated in Table 4 was added and mixed for 30 minutes. The reaction material was taken out of the flask, cooled, and ground to obtain a polyester resin S-16. The physical properties are shown in Table 4.

Production Example S-17

A polyester resin S-17 was obtained in the same manner as in Production Example S-16 with feeding compositions as indicated in Table 4. The physical properties are shown in Table 4.

Production Example S-18

A 4-necked flask was equipped with a reflux condenser, a water-separating unit, a nitrogen gas inlet tube, a thermometer and a stirrer. Thereinto were fed alcohol components and carboxylic acid components with feeding compositions as indicated in Table 4. Thereinto was fed 0.3 mass parts of dibutyltin oxide, based on the total weight of 100 mass parts of the alcohol components and carboxylic acid components. The reaction was carried out by heating the flask to 180 to 220 degrees centigrade for 8 hours while introducing nitrogen into the flask. Thereafter, the reaction was further carried out under a reduced pressure of equal to or less than 8.0 kPa for 1 hour to carry out dehydration and polycondensation. After the reaction, the flask was cooled to 180 degrees centigrade, and the fatty acid metal salt as indicated in Table 4 was added to 100 mass parts and mixed for 30 minutes. The reaction material was taken out of the flask, cooled, and ground to obtain a polyester resin S-18. The physical properties are shown in Table 4. In Table 4, KB300 represents bisphenol A propylene oxide adduct (a product of Mitsui Chemicals, Inc.).

TABLE 4

Saturated Crystalline Polyester (S)

| | Monomer Composition | | | | | | | | | | |
|---|---|---|---|---|---|---|---|---|---|---|---|
| | Alcohol Component | | | | Carboxylic Acid Component | | | | | | |
| Name of Resin | Ethylene glycol mole % | 1,4-butane diol mole % | 1,6-hexane diol mole % | KB300 mole % | Succinic acid mole % | Adipic acid mole % | Sebacic acid mole % | Icosanedioic acid mole % | Fumaric acid mole % | Iso-phthalic acid mole % | Benzoic acid mole % |
| S-1 | | 100.0 | | | 105.6 | | | | | | |
| S-2 | | 100.0 | | | 105.6 | | | | | | |
| S-3 | | 100.0 | | | 105.6 | | | | | | |
| S-4 | | 100.0 | | | 105.6 | | | | | | |
| S-5 | | 100.0 | | | 105.6 | | | | | | |
| S-6 | | 100.0 | | | 105.6 | | | | | | |
| S-7 | | 100.0 | | | 105.6 | | | | | | |
| S-8 | | 100.0 | | | 105.6 | | | | | | |
| S-9 | | 100.0 | | | 87.3 | 17.5 | | | | | |
| S-10 | | 100.0 | | | 91.0 | 18.2 | | | | | |
| S-11 | 100.0 | | | | 105.6 | | | | | | |
| S-12 | | 100.0 | | | 77.3 | 32.2 | | | | | |
| S-13 | | 100.0 | | | 105.6 | | | | | | |
| S-14 | 100.0 | | | | | | 90.0 | | | | |
| S-15 | | 100.0 | | | | | | 111.0 | | | |
| S-16 | | 100.0 | | | | | | | 100.0 | | |
| S-17 | | | 100.0 | | | | | | 109.2 | | |
| S-18 | | | | 100.0 | | | | | | 104.6 | 13.9 |
| S-19 | 100.0 | | | | | | 90.0 | | | | |
| S-20 | | 100.0 | | | | | | 111.0 | | | |

| Name of Resin | Fatty acid metal salt | | | Physical Properties | | |
|---|---|---|---|---|---|---|
| | Type | Amount mass % | M Content mass % | Melting point ° C. | Peak Mw ×10³ | AV KOHmg/g |
| S-1 | Zinc stearate | 5.0 | 0.52 | 113 | 11.1 | 35 |
| S-2 | Zinc stearate | 1.5 | 0.16 | 113 | 11.3 | 36 |
| S-3 | Zinc stearate | 9.0 | 0.93 | 113 | 10.9 | 34 |
| S-4 | Calcium stearate | 5.0 | 0.33 | 113 | 11.2 | 35 |
| S-5 | Magnesium stearate | 5.0 | 0.21 | 113 | 10.8 | 35 |
| S-6 | Aluminum stearate | 5.0 | 0.15 | 113 | 11.0 | 35 |
| S-7 | Zinc laurate | 5.0 | 0.71 | 113 | 11.3 | 35 |
| S-8 | Zinc behenate | 5.0 | 0.44 | 113 | 11.0 | 35 |
| S-9 | Zinc stearate | 5.0 | 0.52 | 97 | 14.0 | 31 |
| S-10 | Zinc stearate | 5.0 | 0.52 | 95 | 6.0 | 61 |
| S-11 | Zinc stearate | 5.0 | 0.52 | 101 | 10.2 | 39 |
| S-12 | Zinc stearate | 5.0 | 0.52 | 81 | 8.0 | 50 |
| S-13 | — | 0.0 | 0.00 | 113 | 11.0 | 37.0 |
| S-14 | Zinc stearate | 5.0 | 0.52 | 74 | 12.1 | 1.9 |
| S-15 | Zinc stearate | 5.0 | 0.52 | 87 | 13.0 | 36 |
| S-16 | Zinc stearate | 5.0 | 0.52 | 139 | 14.5 | 23 |

TABLE 4-continued

| | | Saturated Crystalline Polyester (S) | | | | |
|---|---|---|---|---|---|---|
| S-17 | Zinc stearate | 5.0 | 0.52 | 113 | 9.3 | 59 |
| S-18 | Zinc stearate | 5.0 | 0.52 | N/A | 5.1 | 30 |
| S-19 | — | 0.0 | 0.00 | 74 | 12.1 | 2.0 |
| S-20 | — | 0.0 | 0.00 | 87 | 13.0 | 38 |

Production Examples of Mixture of Carboxyl Group-containing Vinyl Resin (C) with Releasing Agent Component Production Example C-1

Using the releasing agent as indicated in Table 5, a high molecular weight vinyl resin (H), a low molecular weight vinyl resin (L) and a releasing agent were mixed so as to have compositions as indicated in Table 6. 0.5 mass % of a styrene-ethylene-butylene-styrene block copolymer (SEBS) (product name: Kraton G1652, a product of Kraton Polymers Japan, Ltd.) was further mixed as an additive, based on the total weight of 100 mass % of the high molecular weight vinyl resin (H) and the low molecular weight vinyl resin (L). Thereafter, under xylene reflux, the resulting mixture was mixed for 30 minutes and flashed in a vessel of 1.33 kPa at 190 degrees centigrade for removing a solvent or the like to obtain a resin C-1. The physical properties are shown in Table 6.

Production Examples C-2 to C-23

Resins C-2 to C-23 were obtained in the same manner as in Production Example C-1 with feeding compositions as indicated in Table 6. The physical properties are shown in Table 6.

Production Example C-24

0.40 mass % of zinc stearate was further mixed to the resin C-3 obtained in Production Example C-3. The physical properties are shown in Table 6.

TABLE 5

| | Releasing Agent/Wax | | | |
|---|---|---|---|---|
| Name of Wax | Type | Product Name | | Melting point (° C.) |
| WAX-1 | Fisher-Tropsch Wax | FT100 | Nippon Seiro Co., Ltd. | 98 |
| WAX-2 | Paraffin Wax | HNP-10 | Nippon Seiro Co., Ltd. | 74 |
| WAX-3 | Carnauba Wax | Carnauba No. 1 | Nippon Wax Co., Ltd. | 84 |
| WAX-4 | Polyethylene Wax | Polywax 1000 | Baker-Petrolite Corporation | 113 |
| WAX-5 | Paraffin Wax | HNP-0190 | Nippon Seiro Co., Ltd. | 85 |
| WAX-6 | Ester Wax | WEP-5 | NOF Corporation | 86 |
| WAX-7 | Polypropylene wax | NP105 | Mitsui Chemicals, Inc. | 140 |

TABLE 6

| | Mixture of Carboxyl Group-containing Vinyl Resin C and Releasing Agent | | | | | | | | | |
|---|---|---|---|---|---|---|---|---|---|---|
| | Raw Material Feed | | | | | | | | | |
| | Carboxylic acid group-containing resin C raw material | | | | Releasing agent | | | Fatty acid metal salt | Peak molecular weight ×10³ | Acid value (KOHmg/g) |
| Name of Resin | High molecular weight H | | Low molecular weight L | | Releasing agent 1 | | Releasing agent 2 | | | |
| | Type | mass % | Type | mass % | Type | mass % | Type | mass % | Type | Amount mass % | | |
| C-1 | H-1 | 45 | L-1 | 55 | WAX-1 | 6.0 | | | | 4.8 | 10.3 |
| C-2 | H-1 | 30 | L-2/L-3 | 35/35 | WAX-1 | 6.0 | | | | 5.6 | 6.7 |
| C-3 | H-1 | 30 | L-3 | 70 | WAX-1 | 6.0 | | | | 13.5 | 8.9 |
| C-4 | H-1 | 10 | L-4 | 90 | WAX-1 | 6.0 | | | | 21.0 | 7.1 |
| C-5 | H-2 | 30 | L-3 | 70 | WAX-1 | 6.0 | | | | 13.7 | 8.9 |
| C-6 | H-3 | 30 | L-5 | 70 | WAX-1 | 6.0 | | | | 13.5 | 18.1 |
| C-7 | H-4 | 30 | L-6 | 70 | WAX-1 | 6.0 | | | | 13.7 | 4.0 |
| C-8 | H-1 | 30 | L-3 | 70 | WAX-1 | 1.5 | | | | 13.5 | 9.3 |
| C-9 | H-1 | 30 | L-3 | 70 | WAX-1 | 10.0 | | | | 13.3 | 8.6 |
| C-10 | H-1 | 30 | L-3 | 70 | WAX-2 | 6.0 | | | | 13.6 | 8.9 |
| C-11 | H-1 | 30 | L-3 | 70 | WAX-3 | 6.0 | | | | 13.4 | 8.9 |
| C-12 | H-1 | 30 | L-3 | 70 | WAX-4 | 6.0 | | | | 13.7 | 8.9 |
| C-13 | H-1 | 30 | L-3 | 70 | WAX-5 | 6.0 | | | | 13.1 | 8.9 |
| C-14 | H-1 | 30 | L-3 | 70 | WAX-6 | 6.0 | | | | 13.3 | 8.9 |
| C-15 | H-1 | 30 | L-3 | 70 | WAX-4 | 2.5 | WAX-5 | 2.5 | | 13.5 | 9.0 |
| C-16 | H-1 | 30 | L-2/L-3 | 35/35 | WAX-2 | 2.5 | WAX-4 | 2.5 | | 5.6 | 6.8 |
| C-17 | H-1 | 30 | L-2/L-3 | 35/35 | WAX-2 | 2.5 | WAX-7 | 2.5 | | 5.6 | 6.8 |
| C-19 | H-1 | 30 | L-3 | 70 | WAX-7 | 6.0 | | | | 13.6 | 8.9 |
| C-20 | H-2 | 30 | L-7 | 70 | WAX-1 | 6.0 | | | | 54.0 | 8.9 |
| C-22 | H-1 | 55 | L-1 | 45 | WAX-1 | 6.0 | | | | 4.8 | 11.2 |

TABLE 6-continued

Mixture of Carboxyl Group-containing Vinyl Resin C and Releasing Agent

| | Raw Material Feed | | | | | | | | | |
|---|---|---|---|---|---|---|---|---|---|---|
| | Carboxylic acid group-containing resin C raw material | | | | | | | | | |
| | High | | | | Releasing agent | | | Fatty acid metal salt | Peak molecular weight ×10³ | Acid value (KOHmg/g) |
| Name of Resin | molecular weight H | | Low molecular weight L | | Releasing agent 1 | | Releasing agent 2 | | | |
| | Type | mass % | Type | mass % | Type | mass % | Type | mass % | Type | Amount mass % | | |
| C-23 | H-1 | 5 | L-1 | 95 | WAX-1 | 6.0 | | | | 4.8 | 6.6 |
| C-24 | H-1 | 30 | L-3 | 70 | WAX-1 | 6.0 | | | Zinc stearate | 0.4 | 13.5 | 8.9 |

Production Examples of Binder Resin (R)

Production Examples R-1 to R-52

Respective resins were mixed such that the mass ratio of a mixture of a carboxyl group-containing vinyl resin (C) and a releasing agent, a glycidyl group-containing vinyl resin (E) and a crystalline polyester (S) was the ratio as indicated in Table 7. Thereafter, the mixture was kneaded and reacted at 25 kg/hr and a motor rotation speed of 1,400 rpm by the use of a twin screw kneader (KEXN S-40, a product of Kurimoto, Ltd.) with its temperature set to the reaction temperature as indicated in Table 7. This kneaded product was rapidly cooled using a steel belt cooler (NR3-Hi double cooler, a product of Nippon Belting Co., Ltd.) under conditions of the cooling water temperature of 10 degrees centigrade, the amount of cooling water of 90 L/min and a belt speed of 6 m/min, and then ground to obtain binder resins R-1 to R-52. The physical properties are shown in Table 8. Incidentally, the mass of C (the carboxyl group-containing vinyl resin (C)) in the composition of the binder resin in Table 7 does not include the mass of the releasing agent in calculation of respective ratios and content of M.

TABLE 7

| | Binder Resin | | | | | | |
|---|---|---|---|---|---|---|---|
| | Feeding Binder Resin Raw Material | | | | | | |
| Name of Binder Resin | Mixture of carboxylic group-containing resin C and releasing agent | | Glycidyl group-containing resin E | | Saturated crystalline polyester S | | Reaction temperature |
| | Type | mass % | Type | mass % | Type | mass % | ° C. |
| R-1 | C-1 | 86.7 | E-1 | 6.7 | S-1 | 6.7 | 150 |
| R-2 | C-2 | 86.7 | E-1 | 6.7 | S-1 | 6.7 | 150 |
| R-3 | C-3 | 86.7 | E-1 | 6.7 | S-1 | 6.7 | 150 |
| R-4 | C-4 | 86.7 | E-2 | 6.7 | S-1 | 6.7 | 180 |
| R-5 | C-5 | 86.7 | E-1 | 6.7 | S-1 | 6.7 | 150 |
| R-6 | C-6 | 86.7 | E-1 | 6.7 | S-1 | 6.7 | 150 |
| R-7 | C-7 | 86.7 | E-1 | 6.7 | S-1 | 6.7 | 170 |
| R-8 | C-8 | 86.2 | E-1 | 6.9 | S-1 | 6.9 | 150 |
| R-9 | C-9 | 87.1 | E-1 | 6.5 | S-1 | 6.5 | 150 |
| R-10 | C-10 | 86.7 | E-1 | 6.7 | S-1 | 6.7 | 150 |
| R-11 | C-11 | 86.7 | E-1 | 6.7 | S-1 | 6.7 | 150 |
| R-12 | C-12 | 86.7 | E-1 | 6.7 | S-1 | 6.7 | 150 |
| R-13 | C-13 | 86.7 | E-1 | 6.7 | S-1 | 6.7 | 150 |
| R-14 | C-14 | 86.7 | E-1 | 6.7 | S-1 | 6.7 | 150 |
| R-15 | C-15 | 86.6 | E-1 | 6.7 | S-1 | 6.7 | 150 |
| R-16 | C-16 | 86.7 | E-1 | 6.7 | S-1 | 6.7 | 170 |
| R-17 | C-17 | 86.7 | E-1 | 6.7 | S-1 | 6.7 | 170 |
| R-18 | C-3 | 86.7 | E-1 | 6.7 | S-2 | 6.7 | 150 |
| R-19 | C-3 | 86.7 | E-1 | 6.7 | S-3 | 6.7 | 170 |
| R-20 | C-3 | 86.7 | E-1 | 6.7 | S-4 | 6.7 | 150 |
| R-21 | C-3 | 86.7 | E-1 | 6.7 | S-5 | 6.7 | 150 |
| R-22 | C-3 | 86.7 | E-1 | 6.7 | S-6 | 6.7 | 150 |
| R-23 | C-3 | 86.7 | E-1 | 6.7 | S-7 | 6.7 | 150 |
| R-24 | C-3 | 86.7 | E-1 | 6.7 | S-8 | 6.7 | 150 |
| R-25 | C-13 | 86.7 | E-1 | 6.7 | S-9 | 6.7 | 150 |
| R-26 | C-13 | 86.7 | E-1 | 6.7 | S-10 | 6.7 | 150 |
| R-27 | C-13 | 86.7 | E-1 | 6.7 | S-11 | 6.7 | 150 |
| R-28 | C-10 | 86.7 | E-1 | 6.7 | S-12 | 6.7 | 150 |
| R-29 | C-2 | 83.3 | E-4 | 10.0 | S-1 | 6.7 | 150 |
| R-30 | C-4 | 90.5 | E-3 | 2.9 | S-1 | 6.6 | 180 |
| R-31 | C-3 | 71.2 | E-1 | 6.7 | S-1 | 22.1 | 150 |
| R-32 | C-3 | 79.0 | E-1 | 6.7 | S-1 | 14.3 | 150 |

TABLE 7-continued

| | | | Binder Resin | | | | |
|---|---|---|---|---|---|---|---|
| R-33 | C-3 | 90.5 | E-1 | 6.6 | S-1 | 2.9 | 150 |
| R-35 | C-19 | 86.7 | E-1 | 6.7 | S-1 | 6.7 | 150 |
| R-36 | C-20 | 86.7 | E-1 | 6.7 | S-1 | 6.7 | 150 |
| R-38 | C-3 | 86.7 | E-1 | 6.7 | S-13 | 6.7 | 150 |
| R-39 | C-10 | 86.7 | E-1 | 6.7 | S-14 | 6.7 | 150 |
| R-40 | C-13 | 86.7 | E-1 | 6.7 | S-15 | 6.7 | 150 |
| R-41 | C-3 | 86.7 | E-1 | 6.7 | S-16 | 6.7 | 150 |
| R-42 | C-3 | 86.7 | E-1 | 6.7 | S-17 | 6.7 | 150 |
| R-43 | C-3 | 86.7 | E-1 | 6.7 | S-18 | 6.7 | 150 |
| R-44 | C-13 | 86.7 | E-5 | 6.7 | S-1 | 6.7 | 150 |
| R-45 | C-13 | 86.7 | E-5 | 6.7 | S-13 | 6.7 | 150 |
| R-47 | C-3 | 93.4 | E-1 | 6.6 | — | 0.0 | 150 |
| R-48 | C-22 | 86.7 | E-1 | 6.7 | S-1 | 6.7 | 150 |
| R-49 | C-23 | 86.7 | E-1 | 6.7 | S-1 | 6.7 | 150 |
| R-50 | C-24 | 87.0 | E-1 | 6.7 | S-13 | 6.3 | 150 |
| R-51 | C-10 | 86.7 | E-1 | 6.7 | S-19 | 6.7 | 150 |
| R-52 | C-13 | 86.7 | E-1 | 6.7 | S-20 | 6.7 | 150 |

| | Composition of Binder Resin | | | | | | |
|---|---|---|---|---|---|---|---|
| Name of Binder Resin | Ratio of resin S (relative to C + E + S 100%) mass % | Ratio of resin E (relative to C + E 100%) mass % | Ratio of releasing agent (relative to C + E + S 100%) mass % | Resin S Melting point ° C. | Releasing agent Melting point ° C. | Fatty acid metal salt | M Content (relative to C + E + S 100%) mass % |
| R-1 | 7.0 | 7.5 | 5.2 | 113 | 98 | Zinc stearate | 0.036 |
| R-2 | 7.0 | 7.5 | 5.2 | 113 | 98 | Zinc stearate | 0.036 |
| R-3 | 7.0 | 7.5 | 5.2 | 113 | 98 | Zinc stearate | 0.036 |
| R-4 | 7.0 | 7.5 | 5.2 | 113 | 98 | Zinc stearate | 0.036 |
| R-5 | 7.0 | 7.5 | 5.2 | 113 | 98 | Zinc stearate | 0.036 |
| R-6 | 7.0 | 7.5 | 5.2 | 113 | 98 | Zinc stearate | 0.036 |
| R-7 | 7.0 | 7.5 | 5.2 | 113 | 98 | Zinc stearate | 0.036 |
| R-8 | 7.0 | 7.5 | 1.3 | 113 | 98 | Zinc stearate | 0.036 |
| R-9 | 7.0 | 7.5 | 8.6 | 113 | 98 | Zinc stearate | 0.036 |
| R-10 | 7.0 | 7.5 | 5.2 | 113 | 74 | Zinc stearate | 0.036 |
| R-11 | 7.0 | 7.5 | 5.2 | 113 | 84 | Zinc stearate | 0.036 |
| R-12 | 7.0 | 7.5 | 5.2 | 113 | 113 | Zinc stearate | 0.036 |
| R-13 | 7.0 | 7.5 | 5.2 | 113 | 85 | Zinc stearate | 0.036 |
| R-14 | 7.0 | 7.5 | 5.2 | 113 | 86 | Zinc stearate | 0.036 |
| R-15 | 7.0 | 7.5 | 4.3 | 113 | 85/113 | Zinc stearate | 0.036 |
| R-16 | 7.0 | 7.5 | 4.3 | 113 | 74/113 | Zinc stearate | 0.036 |
| R-17 | 7.0 | 7.5 | 4.3 | 113 | 74/140 | Zinc stearate | 0.036 |
| R-18 | 7.0 | 7.5 | 5.2 | 113 | 98 | Zinc stearate | 0.011 |
| R-19 | 7.0 | 7.5 | 5.2 | 113 | 98 | Zinc stearate | 0.065 |
| R-20 | 7.0 | 7.5 | 5.2 | 113 | 98 | Calcium stearate | 0.023 |
| R-21 | 7.0 | 7.5 | 5.2 | 113 | 98 | Magnesium stearate | 0.014 |
| R-22 | 7.0 | 7.5 | 5.2 | 113 | 98 | Aluminum stearate | 0.011 |
| R-23 | 7.0 | 7.5 | 5.2 | 113 | 98 | Zinc laurate | 0.049 |
| R-24 | 7.0 | 7.5 | 5.2 | 113 | 98 | Zinc behenate | 0.031 |
| R-25 | 7.0 | 7.5 | 5.2 | 97 | 85 | Zinc stearate | 0.036 |
| R-26 | 7.0 | 7.5 | 5.2 | 95 | 85 | Zinc stearate | 0.036 |
| R-27 | 7.0 | 7.5 | 5.2 | 101 | 85 | Zinc stearate | 0.036 |
| R-28 | 7.0 | 7.5 | 5.2 | 81 | 74 | Zinc stearate | 0.036 |
| R-29 | 7.0 | 11.3 | 5.0 | 113 | 98 | Zinc stearate | 0.036 |
| R-30 | 7.0 | 3.2 | 5.4 | 113 | 98 | Zinc stearate | 0.036 |
| R-31 | 23.0 | 9.1 | 4.2 | 113 | 98 | Zinc stearate | 0.119 |
| R-32 | 15.0 | 8.2 | 4.7 | 113 | 98 | Zinc stearate | 0.078 |
| R-33 | 3.0 | 7.2 | 5.4 | 113 | 98 | Zinc stearate | 0.016 |
| R-35 | 7.0 | 7.5 | 5.2 | 113 | 140 | Zinc stearate | 0.036 |
| R-36 | 7.0 | 7.5 | 5.2 | 113 | 98 | Zinc stearate | 0.036 |
| R-38 | 7.0 | 7.5 | 5.2 | 113 | 98 | — | 0.000 |
| R-39 | 7.0 | 7.5 | 5.2 | 74 | 74 | Zinc stearate | 0.036 |
| R-40 | 7.0 | 7.5 | 5.2 | 87 | 85 | Zinc stearate | 0.036 |
| R-41 | 7.0 | 7.5 | 5.2 | 139 | 98 | Zinc stearate | 0.036 |
| R-42 | 7.0 | 7.5 | 5.2 | 113 | 98 | Zinc stearate | 0.036 |
| R-43 | 7.0 | 7.5 | 5.2 | N/A | 98 | Zinc stearate | 0.036 |
| R-44 | 7.0 | 7.5 | 5.2 | 113 | 85 | Zinc stearate | 0.036 |
| R-45 | 7.0 | 7.5 | 5.2 | 113 | 85 | — | 0.000 |
| R-47 | 0.0 | 7.0 | 5.6 | N/A | 98 | — | 0.000 |
| R-48 | 7.0 | 7.5 | 5.2 | 113 | 98 | Zinc stearate | 0.036 |
| R-49 | 7.0 | 7.5 | 5.2 | 113 | 98 | Zinc stearate | 0.036 |
| R-50 | 6.7 | 7.5 | 5.2 | 113 | 98 | Zinc stearate | 0.036 |
| R-51 | 7.0 | 7.5 | 5.2 | 74 | 74 | — | 0.000 |
| R-52 | 7.0 | 7.5 | 5.2 | 87 | 85 | — | 0.000 |

TABLE 8

Physical Properties of Binder Resin

Physical Properties of Resin

| Name of Binder Resin | Peak molecule ×10³ | THF insoluble content mass % | AV KOHmg/g | G' Minimum value ×10³ Pa | G" Peak °C. | G" (120° C.) ×10⁴ Pa | Mw ×10³ | Mw/Mn |
|---|---|---|---|---|---|---|---|---|
| R-1  | 4.7  | 14.4 | 9.5  | 10.50 | 76 | 2.0 | 157.9 | 48 |
| R-2  | 5.6  | 10.9 | 6.6  | 5.32  | 76 | 1.5 | 58.0  | 18 |
| R-3  | 13.7 | 7.8  | 8.6  | 3.10  | 75 | 0.9 | 140.1 | 29 |
| R-4  | 21.0 | 4.8  | 7.0  | 1.02  | 80 | 1.6 | 95.7  | 13 |
| R-5  | 13.6 | 9.6  | 8.6  | 3.60  | 77 | 1.1 | 117.0 | 22 |
| R-6  | 13.5 | 17.2 | 16.5 | 4.18  | 75 | 1.0 | 121.0 | 25 |
| R-7  | 13.6 | 6.1  | 5.3  | 1.27  | 74 | 0.7 | 143.0 | 29 |
| R-8  | 13.5 | 4.4  | 8.8  | 4.08  | 77 | 1.3 | 76.3  | 14 |
| R-9  | 13.4 | 11.2 | 8.3  | 3.06  | 73 | 0.6 | 115.0 | 22 |
| R-10 | 13.5 | 7.2  | 8.6  | 2.05  | 70 | 0.4 | 126.3 | 27 |
| R-11 | 13.6 | 7.8  | 8.7  | 3.15  | 70 | 0.5 | 137.3 | 29 |
| R-12 | 13.5 | 7.6  | 8.7  | 3.19  | 75 | 1.1 | 126.9 | 25 |
| R-13 | 13.2 | 7.6  | 8.6  | 3.05  | 74 | 0.7 | 117.4 | 24 |
| R-14 | 13.4 | 7.5  | 8.6  | 3.00  | 73 | 0.8 | 127.1 | 25 |
| R-15 | 13.6 | 7.8  | 8.6  | 3.95  | 74 | 0.7 | 142.1 | 28 |
| R-16 | 5.5  | 9.8  | 6.7  | 4.08  | 75 | 1.3 | 49.8  | 13 |
| R-17 | 5.3  | 9.6  | 6.7  | 3.03  | 75 | 1.1 | 55.0  | 16 |
| R-18 | 13.7 | 5.9  | 8.6  | 1.11  | 73 | 0.7 | 109.3 | 21 |
| R-19 | 13.6 | 19.8 | 8.2  | 4.19  | 74 | 1.0 | 60.8  | 14 |
| R-20 | 13.2 | 7.9  | 8.6  | 3.05  | 74 | 1.0 | 123.3 | 23 |
| R-21 | 13.5 | 8.3  | 8.7  | 2.90  | 74 | 1.0 | 132.1 | 26 |
| R-22 | 13.5 | 7.9  | 8.6  | 3.41  | 74 | 1.0 | 128.3 | 26 |
| R-23 | 13.1 | 8.9  | 8.6  | 3.20  | 75 | 1.1 | 119.8 | 25 |
| R-24 | 13.7 | 7.8  | 8.6  | 3.18  | 74 | 1.0 | 131.5 | 25 |
| R-25 | 13.6 | 8.3  | 8.1  | 5.12  | 73 | 0.9 | 87.2  | 19 |
| R-26 | 13.7 | 8.3  | 10.5 | 2.63  | 72 | 0.7 | 119.7 | 21 |
| R-27 | 13.8 | 8.1  | 8.8  | 2.97  | 75 | 1.1 | 121.0 | 22 |
| R-28 | 13.5 | 7.8  | 9.6  | 1.95  | 70 | 0.3 | 126.3 | 27 |
| R-29 | 5.6  | 6.8  | 7.0  | 0.64  | 75 | 1.0 | 164.9 | 43 |
| R-30 | 21.0 | 9.1  | 7.5  | 1.36  | 79 | 1.7 | 146.4 | 20 |
| R-31 | 13.5 | 20.5 | 12.7 | 2.45  | 72 | 0.9 | 87.5  | 20 |
| R-32 | 13.5 | 12.3 | 10.6 | 2.83  | 73 | 0.9 | 110.1 | 25 |
| R-33 | 13.5 | 4.2  | 7.9  | 1.29  | 75 | 1.0 | 141.6 | 28 |
| R-35 | 13.6 | 8.2  | 8.5  | 3.14  | 77 | 1.5 | 110.5 | 23 |
| R-36 | 54.0 | 11.3 | 8.4  | 4.73  | 77 | 2.8 | 93.6  | 11 |
| R-38 | 13.5 | 2.9  | 9.5  | 0.95  | 73 | 0.9 | 156.8 | 31 |
| R-39 | 13.5 | 7.9  | 6.3  | 2.58  | 67 | 0.4 | 136.8 | 27 |
| R-40 | 13.2 | 8.3  | 8.6  | 2.11  | 67 | 0.2 | 146.2 | 29 |
| R-41 | 13.5 | 8.4  | 7.5  | 4.51  | 73 | 1.2 | 140.1 | 27 |
| R-42 | 13.1 | 8.0  | 10.0 | 3.06  | 72 | 0.9 | 130.8 | 26 |
| R-43 | 13.1 | 7.8  | 8.2  | 2.13  | 75 | 1.2 | 126.5 | 23 |
| R-44 | 13.6 | 2.5  | 10.1 | 0.03  | 75 | 0.9 | 158.5 | 32 |
| R-45 | 13.6 | 2.5  | 10.2 | 0.04  | 75 | 1.0 | 153.2 | 33 |
| R-47 | 13.7 | 2.0  | 7.6  | 2.19  | 77 | 1.3 | 143.8 | 29 |
| R-48 | 4.8  | 33.4 | 10.4 | 19.40 | 76 | 2.8 | 98.3  | 38 |
| R-49 | 4.8  | 2.8  | 7.9  | 0.01  | 77 | 0.1 | 21.0  | 10 |
| R-50 | 13.5 | 9.6  | 8.8  | 4.35  | 74 | 1.0 | 64.6  | 13 |
| R-51 | 13.5 | 2.5  | 7.1  | 0.76  | 66 | 0.4 | 158.8 | 32 |
| R-52 | 13.5 | 2.3  | 9.5  | 0.63  | 66 | 0.2 | 156.2 | 31 |

Production Examples of Toner for Electrophotography (T)

Production Examples T-1 to T-49, T-53, T-54

6 mass % of carbon black (MA100, a product of Mitsubishi Chemical Corporation) and 0.5 mass % of a charge controlling agent (T-77, a product of Hodogaya Chemical Co., Ltd.) were added to 100 mass % of the binder resin (R) as indicated in Table 7 or 8. The resulting mixture was mixed by means of a Henschel mixer, and then kneaded in a twin screw kneader (PCM-30 type, a product of Ikegai Corporation) at 120 degrees centigrade of the resin temperature at the discharge unit of the twin screw kneader for 30 seconds of the residence time. Next, after cooling, grinding and classifying, 0.5 mass % of hydrophobic fine silica powder (R-812, a product of Nippon Aerosil Co., Ltd.) and 0.2 mass % of hydrophobic titanium oxide (NKT-90, a product of Nippon Aerosil Co., Ltd.) were added to obtain toners T-1 to T-49, T-53 and T-54 having a volume median diameter D50 measured with a coulter counter of about 7.5 μm. The physical properties are shown in Table 9 or 11.

Production Example T-50

A toner T-50 was obtained in the same manner as in Production Example T-1, except that 93 mass % of R-47 as a binder resin (R) and 7 mass % of the polyester resin S-13 were used. The physical properties are shown in Table 9.

Production Example T-51

A toner T-51 was obtained in the same manner as in Production Example T-50, except that 0.2 mass % of zinc stearate (a product of Kanto Chemical Co., Inc.) was added in addition to 0.5 mass % of hydrophobic fine silica powder (R-812, a product of Nippon Aerosil Co., Ltd.) and 0.2 mass % of hydrophobic titanium oxide (NKT-90, a product of Nippon Aerosil Co., Ltd.). The physical properties are shown in Table 9.

Production Example T-52

A toner T-52 was obtained in the same manner as in Production Example T-1, except that 100 mass % of R-50 was used as a binder resin (R). The physical properties are shown in Table 9.

TABLE 9

Physical Properties of Toner

| Name of Toner | Name of Binder Resin | Peak molecule $\times 10^3$ | THF insoluble content mass % | AV KOHmg/g | G' Minimum value $\times 10^3$ Pa | G" Peak °C. | G" (120° C.) $\times 10^4$ Pa | Mw $\times 10^3$ | Mw/Mn |
|---|---|---|---|---|---|---|---|---|---|
| T-1 | R-1 | 4.7 | 9.1 | 9.2 | 10.6 | 77 | 2.3 | 124.4 | 33 |
| T-2 | R-2 | 5.6 | 8.3 | 6.4 | 3.0 | 77 | 1.8 | 36.8 | 10 |
| T-3 | R-3 | 13.5 | 6.8 | 8.4 | 1.7 | 76 | 1.2 | 104.3 | 19 |
| T-4 | R-4 | 21.1 | 5.4 | 6.5 | 0.9 | 81 | 1.9 | 123.2 | 16 |
| T-5 | R-5 | 13.5 | 7.7 | 8.4 | 1.8 | 78 | 1.4 | 79.5 | 13 |
| T-6 | R-6 | 13.5 | 10.7 | 16.1 | 2.1 | 76 | 1.3 | 69.2 | 16 |
| T-7 | R-7 | 13.4 | 6.0 | 5.2 | 1.0 | 75 | 1.0 | 123.2 | 23 |
| T-8 | R-8 | 13.5 | 5.2 | 8.7 | 2.0 | 78 | 1.6 | 74.1 | 14 |
| T-9 | R-9 | 13.2 | 8.4 | 8.1 | 2.5 | 74 | 0.9 | 101.1 | 19 |
| T-10 | R-10 | 13.6 | 6.5 | 8.4 | 1.2 | 71 | 0.4 | 95.2 | 18 |
| T-11 | R-11 | 13.6 | 6.8 | 8.5 | 1.6 | 71 | 0.7 | 107.5 | 20 |
| T-12 | R-12 | 13.3 | 6.7 | 8.5 | 1.6 | 76 | 1.3 | 87.9 | 18 |
| T-13 | R-13 | 13.5 | 6.7 | 8.4 | 1.5 | 75 | 1.0 | 104.7 | 22 |
| T-14 | R-14 | 13.3 | 6.7 | 8.4 | 1.5 | 74 | 1.1 | 101.2 | 20 |
| T-15 | R-15 | 13.7 | 6.8 | 8.4 | 1.9 | 75 | 1.0 | 115.7 | 23 |
| T-16 | R-16 | 5.4 | 7.8 | 6.5 | 2.0 | 76 | 1.5 | 49.3 | 13 |
| T-17 | R-17 | 5.7 | 7.7 | 6.5 | 1.5 | 76 | 1.4 | 54.8 | 16 |
| T-18 | R-18 | 13.5 | 5.9 | 8.4 | 1.0 | 74 | 1.0 | 104.1 | 20 |
| T-19 | R-19 | 13.5 | 12.4 | 8.1 | 2.1 | 75 | 1.3 | 41.3 | 9 |
| T-20 | R-20 | 13.5 | 6.9 | 8.4 | 1.5 | 75 | 1.3 | 98.7 | 19 |
| T-21 | R-21 | 13.4 | 7.0 | 8.5 | 1.5 | 75 | 1.3 | 89.6 | 17 |
| T-22 | R-22 | 13.2 | 6.9 | 8.4 | 1.7 | 75 | 1.3 | 100.8 | 21 |
| T-23 | R-23 | 13.5 | 7.3 | 8.5 | 1.6 | 76 | 1.3 | 94.3 | 20 |
| T-24 | R-24 | 13.5 | 6.8 | 8.4 | 1.6 | 75 | 1.3 | 112.8 | 21 |
| T-25 | R-25 | 13.8 | 7.0 | 7.9 | 2.6 | 74 | 1.2 | 66.3 | 14 |
| T-26 | R-26 | 13.7 | 7.0 | 10.2 | 1.4 | 73 | 1.0 | 88.5 | 16 |
| T-27 | R-27 | 13.7 | 7.0 | 8.7 | 1.5 | 76 | 1.4 | 81.2 | 15 |
| T-28 | R-28 | 13.5 | 6.8 | 9.3 | 1.2 | 71 | 0.4 | 94.6 | 18 |
| T-29 | R-29 | 5.7 | 6.3 | 6.9 | 0.6 | 76 | 1.3 | 135.3 | 35 |
| T-30 | R-30 | 21.3 | 7.4 | 7.3 | 1.0 | 81 | 2.0 | 123.2 | 16 |
| T-31 | R-31 | 13.5 | 12.9 | 12.4 | 2.3 | 73 | 1.1 | 50.3 | 11 |
| T-32 | R-32 | 13.2 | 8.9 | 10.4 | 1.9 | 74 | 1.1 | 83.5 | 19 |
| T-33 | R-33 | 13.5 | 5.1 | 7.8 | 1.0 | 76 | 1.3 | 136.3 | 27 |
| T-35 | R-35 | 13.1 | 7.0 | 8.3 | 1.6 | 78 | 1.8 | 80.5 | 17 |
| T-36 | R-36 | 55.4 | 8.5 | 8.1 | 2.4 | 78 | 3.0 | 42.8 | 5 |
| T-38 | R-38 | 13.6 | 4.5 | 9.4 | 0.9 | 74 | 1.1 | 143.5 | 28 |
| T-41 | R-41 | 13.5 | 7.1 | 7.3 | 2.2 | 74 | 1.5 | 111.6 | 22 |
| T-42 | R-42 | 13.5 | 6.9 | 9.9 | 1.5 | 73 | 1.2 | 110.2 | 22 |
| T-43 | R-43 | 13.4 | 6.8 | 8.0 | 1.2 | 76 | 1.4 | 99.6 | 18 |
| T-44 | R-44 | 13.6 | 2.5 | 10.1 | 0.03 | 76 | 1.2 | 176.3 | 36 |
| T-45 | R-45 | 13.7 | 2.8 | 10.2 | 0.04 | 76 | 1.2 | 163.2 | 35 |
| T-47 | R-47 | 13.5 | 4.1 | 7.5 | 1.2 | 76 | 1.6 | 145.8 | 25 |
| T-48 | R-48 | 4.7 | 30.6 | 10.0 | 16.2 | 75 | 2.9 | 48.3 | 19 |
| T-49 | R-49 | 4.8 | 2.7 | 7.8 | 0.01 | 75 | 0.2 | 17.5 | 8 |
| T-50 | R-47/S-13 | 13.6 | 4.3 | 9.7 | 1.1 | 74 | 1.2 | 138.5 | 25 |
| T-51 | R-47/S-13 | 13.6 | 4.3 | 9.7 | 1.1 | 74 | 1.2 | 138.5 | 25 |
| T-52 | R-50 | 13.5 | 7.7 | 8.5 | 2.1 | 75 | 1.2 | 41.3 | 7 |

Examples 1 to 33 and Comparative Examples 1 to 14

97 mass % of a carrier (F-150, a product of Powdertech Corp.) was mixed to 3 mass % of the toner as described in Table 9 to give a developing agent. Various evaluations were performed. The results are shown in Table 10.

TABLE 10

Evaluation Results of Toner Performance

| Example/Comparative Example No. | Name of Toner | Fixing Properties | Offset Resistance | Smear Resistance | Storage Stability | Durability | Stain Resistance in Sensitive Material |
|---|---|---|---|---|---|---|---|
| Example 1 | T-1 | A | A | A | A | A | A |
| Example 2 | T-2 | A | A | A | A | A | A |
| Example 3 | T-3 | A | A | A | A | A | A |
| Example 4 | T-4 | A | A | A | A | A | A |
| Example 5 | T-5 | A | A | A | A | A | A |
| Example 6 | T-6 | A | A | A | A | A | A |
| Example 7 | T-7 | A | A | A | A | A | A |
| Example 8 | T-8 | A | B | A | A | A | A |
| Example 9 | T-9 | A | A | A | B | A | B |
| Example 10 | T-10 | A | A | A | B | A | A |
| Example 11 | T-11 | A | A | A | B | A | A |
| Example 12 | T-12 | A | A | A | A | A | A |
| Example 13 | T-13 | A | A | A | A | A | A |
| Example 14 | T-14 | A | A | A | A | A | A |
| Example 15 | T-15 | A | A | A | A | A | A |
| Example 16 | T-16 | A | A | A | A | A | A |
| Example 17 | T-17 | A | A | A | A | A | A |
| Example 18 | T-18 | A | A | A | A | A | A |
| Example 19 | T-19 | A | A | A | A | A | A |
| Example 20 | T-20 | A | A | A | A | A | A |
| Example 21 | T-21 | A | A | A | A | A | A |
| Example 22 | T-22 | A | A | A | A | A | A |
| Example 23 | T-23 | A | A | A | A | A | A |
| Example 24 | T-24 | A | A | A | A | A | A |
| Example 25 | T-25 | A | A | A | A | A | A |
| Example 26 | T-26 | A | A | A | A | A | A |
| Example 27 | T-27 | A | A | A | A | A | A |
| Example 28 | T-28 | A | A | A | B | A | B |
| Example 29 | T-29 | A | A | A | A | A | A |
| Example 30 | T-30 | A | A | A | A | A | A |
| Example 31 | T-31 | A | A | A | B | B | B |
| Example 32 | T-32 | A | A | A | A | A | A |
| Example 33 | T-33 | B | A | B | A | A | A |
| Comparative Example 1 | T-35 | C | C | A | A | A | A |
| Comparative Example 2 | T-36 | C | A | C | A | A | A |
| Comparative Example 3 | T-38 | A | C | B | C | C | C |
| Comparative Example 4 | T-41 | C | A | C | A | C | C |
| Comparative Example 5 | T-42 | B | A | A | C | A | C |
| Comparative Example 6 | T-43 | C | A | C | A | A | A |
| Comparative Example 7 | T-44 | A | C | A | C | C | C |
| Comparative Example 8 | T-45 | A | C | A | C | C | C |
| Comparative Example 9 | T-47 | C | B | C | A | A | A |
| Comparative Example 10 | T-48 | C | A | C | A | A | A |
| Comparative Example 11 | T-49 | A | C | C | A | C | C |
| Comparative Example 12 | T-50 | A | B | B | C | C | C |
| Comparative Example 13 | T-51 | A | B | B | C | C | C |
| Comparative Example 14 | T-52 | A | A | B | C | B | C |

As clear from the results in Table 10, all of the binder resin for a toner and the toner using the resin to be produced according to the present invention were excellent in balancing various properties.

Examples 34, 35 and Comparative Examples 15, 16

The following evaluation was carried out for Examples 34 and 35.
97 mass % of a carrier (F-150, a product of Powdertech Corp.) was mixed to 3 mass % of the toners (T-39 and T-40) as indicated in Table 11 to give a developing agent. Various evaluations were performed.

The following evaluation was carried out for Comparative Examples 15 and 16.
97 mass % of a carrier (F-150, a product of Powdertech Corp.) was mixed to 3 mass % of the toners (T-53 and T-54) in the same manner as in toners (T-39 and T-40) as indicated in Table 11 to give a developing agent, except that 5 mass % of zinc stearate was added to the saturated crystalline polyester resin (S). Various evaluations were performed.

Storage stability in Examples 34 and 35 was improved as compared to storage stability in Comparative Examples 15 and 16.

TABLE 11

Physical Properties of Toner

| Name of Toner | Name of Binder Resin | Peak molecule ×10³ | THF insoluble content mass % | AV KOHmg/g | G' minimum value ×10³ Pa | G" peak °C. | G" (120° C.) ×10⁴ Pa | Mw ×10³ | Mw/Mn |
|---|---|---|---|---|---|---|---|---|---|
| T-39 | R-39 | 13.5 | 6.9 | 6.1 | 1.4 | 67 | 0.6 | 110.3 | 22 |
| T-40 | R-40 | 13.5 | 7.0 | 8.4 | 1.2 | 68 | 0.4 | 98.6 | 19 |
| T-53 | R-51 | 13.5 | 4.3 | 6.9 | 0.8 | 67 | 0.5 | 136.2 | 24 |
| T-54 | R-52 | 13.5 | 4.2 | 9.2 | 0.7 | 67 | 0.3 | 133.8 | 24 |

This application is based on Japanese patent application No. 2009-265071 filed on Nov. 20, 2009, the content of which is incorporated hereinto by reference.

The invention claimed is:

1. A binder resin for a toner comprising a carboxyl group-containing vinyl resin (C), a glycidyl group-containing vinyl resin (E), a reaction product of the vinyl resins and a saturated crystalline polyester (S), wherein said saturated crystalline polyester (S) has a melting point of equal to or more than 75 degrees centigrade and equal to or less than 120 degrees centigrade,
a metal component (M) selected from Zn, Ca, Mg, Al and Ba (however, excluding metal oxide) is dispersed in said saturated crystalline polyester (S), and
the loss modulus (G") of said binder resin for a toner at 120 degrees centigrade is equal to or more than $0.3 \times 10^4$ Pa and equal to or less than $2.7 \times 10^4$ Pa at a measurement frequency of 6.28 rad/sec, and the minimum value of the storage modulus (G') at equal to or more than 50 degrees centigrade and equal to or less than 200 degrees centigrade is equal to or more than $1.0 \times 10^2$ Pa and equal to or less than $1.5 \times 10^4$ Pa.

2. The binder resin for a toner according to claim 1, wherein said metal component (M) is contained in an amount of equal to or more than 0.011 mass % and equal to or less than 1 mass %, based on the total weight of 100 mass % of said carboxyl group-containing vinyl resin (C), said glycidyl group-containing vinyl resin (E), a reaction product of the vinyl resins and said saturated crystalline polyester (S).

3. The binder resin for a toner according to claim 1, wherein said metal component (M) is derived from an organic metal salt.

4. The binder resin for a toner according to claim 1, wherein said metal component (M) is derived from a fatty acid metal salt represented by the following general formula, $$(C_nH_{2n+1}COO)_m\text{-}M$$

wherein, in the formula, n is an integer of 11 to 22; m is an integer of 2 to 3; and M is a metal selected from Zn, Ca, Mg, Al and Ba.

5. The binder resin for a toner according to claim 1, having one peak of the loss modulus (G") at equal to or more than 70 degrees centigrade and equal to or less than 85 degrees centigrade at a measurement frequency of 6.28 rad/sec.

6. The binder resin for a toner according to claim 1, comprising a releasing agent having a melting point at equal to or less than the melting point of said saturated crystalline polyester (S).

7. The binder resin for a toner according to claim 6, wherein the melting point of said releasing agent is equal to or more than −50 degrees centigrade and equal to or less than 0 degree centigrade relative to the melting point of said saturated crystalline polyester (S), and
said releasing agent is contained in an amount of equal to or more than 1 mass % and equal to or less than 10 mass %, based on the total weight of 100 mass % of said carboxyl group-containing vinyl resin (C), said glycidyl group-containing vinyl resin (E), a reaction product of the vinyl resins, and said saturated crystalline polyester (S).

8. The binder resin for a toner according to claim 1, wherein said saturated crystalline polyester (S) is obtained by subjecting an alcohol component selected from aliphatic diols having 2 to 4 carbon atoms and a carboxylic acid component selected from aliphatic dicarboxylic acids having 4 to 6 carbon atoms to polycondensation.

9. The binder resin for a toner according to claim 1, wherein said saturated crystalline polyester (S) is contained in an amount of equal to or more than 1 mass % and equal to or less than 25 mass %, based on the total weight of 100 mass % of said carboxyl group-containing vinyl resin (C), said glycidyl group-containing vinyl resin (E), a reaction product of the vinyl resins and said saturated crystalline polyester (S).

10. The binder resin for a toner according to claim 1, wherein said saturated crystalline polyester (S) has a main peak in the molecular weight region of equal to or more than 5,000 and equal to or less than 15,000 in the molecular weight distribution measured by gel permeation chromatography (GPC) of the chloroform soluble content, and the acid value of said saturated crystalline polyester (S) is equal to or more than 25 mgKOH/g and equal to or less than 70 mgKOH/g.

11. The binder resin for a toner according to claim 1, wherein the tetrahydrofuran (THF) soluble content in said binder resin for a toner has a main peak in the molecular weight region of equal to or more than 3,000 and less than 25,000 in the molecular weight distribution measured by gel permeation chromatography (GPC),
the THF insoluble content in said binder resin for a toner is contained in an amount of equal to or more than 3 mass % and less than 30 mass %, and
the acid value of said binder resin for a toner is equal to or more than 4.5 mgKOH/g and equal to or less than 30 mgKOH/g.

12. The binder resin for a toner according to claim 1, wherein said carboxyl group-containing vinyl resin (C) contains a high molecular weight vinyl resin (H) in which the THF soluble content has a peak in the molecular weight region of equal to or more than 150,000 and less than 350,000 in the chromatogram obtained by GPC and a low molecular weight vinyl resin (L) in which the THF soluble content has a peak in the molecular weight region of equal to or more than 3,000 and less than 25,000 in the chromatogram obtained by GPC,
the mass ratio (H/L) of said high molecular weight vinyl resin (H) to said low molecular weight vinyl resin (L) in said carboxyl group-containing vinyl resin (C) is equal to or more than 10/90 and equal to or less than 50/50,
the acid value of said carboxyl group-containing vinyl resin (C) is equal to or more than 3 mgKOH/g and equal to or less than 25 mgKOH/g,
the THF soluble content of said glycidyl group-containing vinyl resin (E) has a peak in the molecular weight region of equal to or more than 30,000 and equal to or less than 70,000 in the chromatogram obtained by GPC and the epoxy value is equal to or more than 0.003 Eq/100 g and equal to or less than 0.100 Eq/100 g, and
the mass ratio (C/E) of said carboxyl group-containing vinyl resin (C) to said glycidyl group-containing vinyl resin (E) is equal to or more than 87/13 and equal to or less than 99/1.

13. A toner comprising a binder resin for a toner and a coloring agent, wherein the loss modulus (G") at 120 degrees centigrade is equal to or more than $0.3 \times 10^4$ Pa and equal to or less than $2.7 \times 10^4$ Pa at a measurement frequency of 6.28 rad/sec,
the minimum value of the storage modulus (G') at equal to or more than 50 degrees centigrade and equal to or less than 200 degrees centigrade is equal to or more than $1.0 \times 10^2$ Pa and equal to or less than $1.5 \times 10^4$ Pa, and
said binder resin for a toner is the binder resin for a toner according to claim 1.

14. The toner according to claim 13, having one peak of the loss modulus (G") at equal to or more than 70 degrees centigrade and equal to or less than 85 degrees centigrade at a measurement frequency of 6.28 rad/sec.

15. The toner according to claim 13, wherein the tetrahydrofuran (THF) soluble content of said toner has a main peak in the molecular weight region of equal to or more than 2,000 and less than 25,000 in the molecular weight distribution measured by gel permeation chromatography (GPC), and
the THF insoluble content derived from said binder resin for a toner is contained in an amount of equal to or more than 3 mass % and less than 30 mass %.

16. A method for producing a binder resin for a toner according to claim 1, comprising:
obtaining a mixture with the addition of an organic metal salt to a saturated crystalline polyester (S), and
mixing said obtained mixture, a carboxyl group-containing vinyl resin (C) and a glycidyl group-containing vinyl resin (E).

17. A method for producing a toner comprising:
obtaining a binder resin for a toner, and
mixing said binder resin for a toner and a coloring agent, in which said binder resin for a toner is obtained according to the production method according to claim 16.

18. A binder resin for a toner comprising a carboxyl group-containing vinyl resin (C), a glycidyl group-containing vinyl resin (E), a reaction product of the vinyl resins and a saturated crystalline polyester (S), wherein said saturated crystalline polyester (S) has a melting point of equal to or more than 75 degrees centigrade and equal to or less than 120 degrees centigrade,
a metal component (M) selected from Zn, Ca, Mg, Al and Ba (however, excluding metal oxide) is dispersed in said saturated crystalline polyester (S), and
the loss modulus (G") of said binder resin for a toner at 120 degrees centigrade is equal to or more than $0.3 \times 10^4$ Pa and equal to or less than $2.7 \times 10^4$ Pa at a measurement frequency of 6.28 rad/sec, and the minimum value of the storage modulus (G') at equal to or more than 50 degrees centigrade and equal to or less than 200 degrees centigrade is equal to or more than $1.0 \times 10^2$ Pa and equal to or less than $1.5 \times 10^4$ Pa,
wherein said metal component (M) is contained in an amount of equal to or more than 0.011 mass % and equal to or less than 1 mass %, based on the total weight of 100 mass % of said carboxyl group-containing vinyl resin (C), said glycidyl group-containing vinyl resin (E), a reaction product of the vinyl resins and said saturated crystalline polyester (S),
wherein said metal component (M) is derived from a fatty acid metal salt represented by the following general formula, $(C_nH_{2n+1}COO)_m-M$ wherein, in the formula, n is an integer of 11 to 22; m is an integer of 2 to 3; and M is a metal selected from Zn, Ca, Mg, Al and Ba.

* * * * *